United States Patent
Heimann et al.

(10) Patent No.: US 6,190,779 B1
(45) Date of Patent: *Feb. 20, 2001

(54) CORROSION RESISTANT COATING CONTAINING AND AMORPHOUS PHASE

(75) Inventors: Robert L. Heimann, Moberly; Nancy M. McGowan, Sturgeon; William M. Dalton, Moberly; David R. Webb, Macon; David L. Price, Moberly, all of MO (US)

(73) Assignee: Elisha Technologies Co LLC, Moberly, MO (US)

( * ) Notice: Under 35 U.S.C. 154(b), the term of this patent shall be extended for 0 days.

This patent is subject to a terminal disclaimer.

(21) Appl. No.: 09/016,853

(22) Filed: Jan. 30, 1998

Related U.S. Application Data

(63) Continuation-in-part of application No. 08/850,586, filed on May 2, 1997, now Pat. No. 6,143,420, and a continuation-in-part of application No. 08/850,323, filed on May 2, 1997, and a continuation-in-part of application No. 08/791,336, filed on Jan. 31, 1997, now Pat. No. 5,928,796, and a continuation-in-part of application No. 08/634,215, filed on Apr. 18, 1996, which is a continuation-in-part of application No. 08/476,271, filed on Jun. 7, 1995, now abandoned, which is a continuation-in-part of application No. 08/327,438, filed on Oct. 21, 1994, now Pat. No. 5,714,093.

(51) Int. Cl.[7] .............................. C23F 11/06; B32B 9/06; B32B 18/00

(52) U.S. Cl. ..................... 428/469; 428/450; 252/389.3; 252/389.5; 252/389.51; 252/389.52; 252/389.53; 423/326; 423/331; 423/332; 106/14.14; 106/600

(58) Field of Search ..................... 252/389.62, 389.3, 252/389.5, 389.51, 389.52, 389.53; 106/14.44, 1.17, 1.18, 1.05, 641, 643, 1.13, 1.16, 14.14, 14.26, 600; 428/469, 450, 702; 423/326, 331, 332

(56) References Cited

U.S. PATENT DOCUMENTS

| 4,645,790 |   | 2/1987 | Frey et al. ......................... 524/442 |
| 4,837,253 | * | 6/1989 | Mansell et al. .................... 523/443 |
| 4,842,645 |   | 6/1989 | Miyata et al. ..................... 106/14.14 |
| 5,068,134 |   | 11/1991 | Cole et al. ....................... 427/376.2 |
| 5,164,003 | * | 11/1992 | Bosco et al. ...................... 106/287.1 |
| 5,330,794 | * | 7/1994 | Bosco et al. ...................... 427/387 |
| 5,714,093 | * | 2/1998 | Heimann et al. ............... 252/389.62 |
| 5,871,668 | * | 2/1999 | Heimann et al. ............... 252/389.62 |
| 5,928,796 | * | 7/1999 | Heimann et al. .................... 428/469 |
| 5,938,976 | * | 8/1999 | Heimann et al. ............... 252/389.62 |

FOREIGN PATENT DOCUMENTS

| 3618841 A1 | 6/1986 | (DE) . |
| WO96/12770 | 5/1996 | (WO) . |

OTHER PUBLICATIONS

CAPLUS 1976:125553.*
CAPLUS 1982: 10392.*
CAPLUS 1993: 258769.*
CAPLUS 1993: 544857.*

* cited by examiner

*Primary Examiner*—Shean C. Wu
(74) *Attorney, Agent, or Firm*—Michael K. Boyer

(57) ABSTRACT

The disclosure relates to the forming mineralized coatings on metal surfaces and to methods of forming such coatings. The coating can include a wide range of compounds and normally at least a portion of the coating corresponds to an amorphous phase. The coating and method are particularly useful in providing a corrosion resistant coating or film upon a metallic surface. This aspect of the disclosure involves the formation of a corrosion resistant "mineralized" layer of tailored composition upon a metal substrate.

15 Claims, No Drawings

CORROSION RESISTANT COATING CONTAINING AND AMORPHOUS PHASE

CROSS-REFERENCE TO RELATED APPLICATIONS

This application is a continuation in part of U.S. patent application Ser. Nos. 08/850,586, filed May 2, 1997, now U.S. Pat. No. 6,143,420 and 08/850,323, filed on May 2, 1997; Ser. Nos. 08/791,336 now U.S. Pat. No. 5,928,796 and 08/791,336, filed on Jan. 31, 1997; 08/634,215 abandoned, entitled "Corrosion Resistant Buffer System for Metal Products" and filed on Apr. 18, 1996 in the names of Robert L. Heimann, et al., which is a continuation in part of U.S. patent application Ser. No. 08/476,271 filed on Jun. 7, 1995, abandoned which in turn is a continuation-in-part of U.S. patent application Ser. No. 08/327,438 filed on Oct. 21, 1994, now U.S. Pat. No. 5,714,093. The disclosure of each of the previously identified patent applications is hereby incorporated by reference.

FIELD OF THE INVENTION

The instant invention relates to the forming coatings on metal containing surfaces and to methods of forming such coatings on a suitable substrate. The coating can include a wide range of compounds and normally at least a portion of the coating corresponds to an amorphous phase. The inventive coating and method are particularly useful in providing a corrosion resistant coating or film upon a metallic surface. This aspect of the invention involves the formation of a corrosion resistant "mineralized" layer of tailored composition upon a metal containing surfaces.

BACKGROUND OF THE INVENTION

The corrosion of steel and other metal containing products continues to be a serious technical problem which has profound effects on the economy. Corrosion causes loss of natural resources, and deteriorates key infrastructure such as roads and buildings. It also causes premature replacement of equipment and parts in industrial facilities, boats and other marine vehicles, automobiles, aircraft, among a wide range of metallic components.

Current industry standards for corrosion prevention center around the use of barrier coatings, sacrificial coatings, alloys containing heavy metals such as chromium, nickel, lead, cadmium, copper, mercury, barium, among other heavy metals. The introduction of these materials into the environment, however, can lead to serious health consequences as well as substantial costs to contain or separate the materials or clean up environmental contamination. Damage associated with corrosion, accordingly, is a continuing problem and better systems for preventing corrosion are still needed.

A more detailed discussion of mineral containing materials can be found in Manual of Mineralogy, by Dana, $21^{st}$ edition, American Society of Metals, vol. 13, Corrosion in Structures, "Reaction Sequence in Atmospheric Corrosion of Zinc ASTM STP 1239", by W. W. Kirk et al., and Physics and Chemistry of Mineral Surfaces, by Bradly (1996); the disclosure of each of the aforementioned references is hereby incorporated by reference.

Conventional practices for improving protecting metal containing surfaces and imparting improved surface characteristics to metals rely upon compositions and methods which are undesirable as being costly or environmentally unsound.

SUMMARY OF THE INVENTION

The instant invention solves problems associated with conventional practices by providing an improved method and a composition for improving the surface characteristics of a metal containing surface. While the inventive composition is normally compatible with conventional compositions and methods, the inventive composition can obviate the need to employ heavy metals such as chrome and environmentally undesirable solvents.

The present invention in a broad aspect relates to compositions and methods for improving or modifying the surface characteristics of a metal containing surface. In one aspect, the invention involves methods for forming a "mineralized" layer upon the surface of a substrate. One method of forming the mineralized layer comprises delivering precursors of the mineralized layer to the surface of the metal surface via a carrier. The carrier can be a wide range of known compositions such as a film forming composition, lubricants, gel, sealant, adhesive, paint, solvent and waterborne resins, among other conventional compositions for forming coatings or films upon metals. If desired, the carrier can function as a reservoir of precursor materials thereby permitting additional formation of the mineralized layer, e.g., when in the presence of a reservoir a breach in the mineralized layer can be overcome by secondary mineral formation from mineral precursors in the reservoir—a so-called self healing effect. If desired, the carrier can also function as a reservoir of buffer materials, e.g., materials that passivate the pH of the metal surface, which can protect the metal surface by providing an environment in which the metal is resistant to chemical attack. Depending upon the utility of the carrier, the carrier can be removed or remain permanently in contact with the mineralized surface (and at least a portion of the metal surface).

The instant invention provides an improved surface on articles by tailoring the surface chemistry and effecting a new mineralized surface through chemical reaction and interaction. The mineralized surface is formed when precursors are delivered to the surface of a metal or metal coated articles or substrates. In some cases, the carrier includes materials which can function to buffer the surface, as a precursor of the mineralized layer, alter pH, activate the surface by changing the surface chemical species, or all of these functions. In some cases, the surface mineralization is enhanced by a pretreatment step prior to application of the precursor-containing carrier. After providing a proper environment, precursors can interact thereby in situ forming the mineralized layer upon at least a portion of the metal surface. Depending upon the surface environment, the metal or metal coated substrate can contribute donor ions to react and/or interact with delivered precursors thereby forming a relatively thin mineralized layer that is effective in altering and preferably enhance the characteristics of the entire article, e.g., by altering and preferably enhancing the surface characteristics of the article. Consequently, the instant invention permits tailoring a metal containing surface to possess improved corrosion, coating adhesion, chemical resistance, thermal resistance, mechanical abrasion, acid rain resistance, UV resistance, resistance to effects from atomic oxygen and vacuum UV, engineered electrical resistance, among other improved properties. As will be described below in greater detail, at least a portion of the mineralized coating or layer normally corresponds to a novel amorphous phase.

DETAILED DESCRIPTION

The instant invention relates to compositions and methods for forming a mineralized coating or film upon at least a portion of a metal containing surface. By "mineralized" it is meant a composition containing at least one member selected from the group of oxygenated cations and anions wherein at least a portion of the mineral corresponds to an amorphous phase or matrix that embeds or surrounds an inorganic complex oxide crystal. Normally, the amorphous phase is the predominate phase component of the mineralized layer and, in some cases, substantially transparent to visible light. This type of predominately amorphous structure is characterized by continuous random network (CRN). In general, the mineral layer has a network structure in which metal atoms are bound to oxygen atoms by predominantly covalent bonds. The CRN or network can be modified by the introduction of metal oxides which are, in many embodiments of the invention, contributed by the substrate. By "metal containing surface", "substrate", or "surface" it is meant to refer to a metallic article and any metal containing surface as well as any substrate at least partially coated with a metal layer, film or foil including a non-metallic article having a metal layer. A wide variety of substances can be employed as precursors of the mineralized layer, such as one or more cations of the metals of Groups I, II and III, and the transition metals, of the Periodic Chart of the Elements. Additionally, one or more of the anions selected from the group consisting of water soluble salts and/or oxides of tungsten, molybdenum, chromium, titanium, zircon, vanadium, phosphorus, aluminum, iron, boron, bismuth, gallium, tellurium, germanium, antimony, niobium (also known as columbium), magnesium and manganese, mixtures thereof, among others. Particularly desirable results can be obtained by using salts and oxides of silicon, aluminum and iron.

At least a portion of the resulting mineralized layer having oxide network attributes can be characterized by the following formula:

$$A_xB_yO_z\text{---}nH_2O$$

where A is termed a modifier cation and may be one or more ions selected from Group I, II and/or III metals, and B is a network forming cation, such as silicon, aluminum, iron or magnesium. The values of x and y can be any number except zero but x and y cannot all concurrently be zero and z cannot be zero. "z" can have any value ranging from y to 4y. "n" is water of hydration and has a value of from about 0 to about 10. The relationships of x, y, and z follow rules by Zachariasen in the Journal of the American Chemical Society, Volume 54, page 3841 (1932); hereby incorporated by reference:

1). A high proportion of (network-forming cations are surrounded by oxygen tetrahedra or triangles.
2). The oxygen polyhedra only share corners with each other.
3) Some oxygen atoms are linked to only two cations, and do not form additional bonds with any other cations.

In one aspect of the invention, the complex inorganic crystals that are surrounded by or incorporated within the amorphous matrix to form the mineral layer can also be characterized by the following formula:

$$Mx\ (Si2O7)_A(SiO3)_B(Si4O11)_C(Si4O10)D(OH)_S{}^*nH^2O$$

wherein Mx is one or more metals supplied by the previously described substrate and x ranges from 1 to 5; A+B+C+D=1 wherein A, B, C and D can each individually equal zero but cannot simultaneously be zero; n is the water of hydration and ranges from 0 to 10 and typically ranges from 0 to 6; and "s" is an interger that ranges from about 0 to about 4.

In another aspect of the invention, at least a portion of the crystalline component of the mineral layer that is surrounded or incorporated within the amorphous phase comprises:

$$M_xM_yM''_z(SiO_4)_t(Si2O7)u(OH)2(A)_w(A')_v\text{---}nH_2O$$

where M, M', and M" are ions of Group I, II and/or III metals, and A and A' are the previously defined anions and where x, y, and z each can be any number including zero but x, y and z cannot all concurrently be zero. Analogously, t, u, v, w and x can each be any number including zero but cannot all concurrently be zero. "n" is the water of hydration and normally ranges from about 0 to about 10. At least one of M, M' and M" is a metal supplied from the substrate in contact with the mineralized layer, and normally up to two of M, M' or M" corresponds to an alkali or alkaline earth metal, e.g, calcium, potassium, sodium and mixtures thereof. For example, when the metal substrate comprises zinc and a precursor comprises sodium silicate the crystalline component, which is embedded within the amorphous matrix to form the mineralized layer, comprises $Zn_xNa_yMz(SiO4)_t(Si2O7)_u(OH)_2{}^*nH_2O$.

In a further aspect of the invention, at least a portion of the crystalline component of the mineral layer that is surrounded or incorporated within the amorphous phase comprises:

$$M_xM'_yM''_z(Si2O7)_A(SiO3)_B(Si_4O11)_C(Si4O10)_D(OH)_S(A)_w(A')_v\text{---}nH_2O$$

where M, M', and M" are ions of Group I, II and/or III metals, and A and A' are the previously defined anions and where v, w, x, y, and z each can be any number including zero but x, y and z cannot all concurrently be zero. Analogously, A, B, C and D can each be any number including zero but cannot all concurrently be zero. "n" is the water of hydration and normally ranges from about 0 to about 10; and typically, ranges from about 0 to 6. "S" is an interger that ranges from about 0 to about 4. At least one of M, M' and M" is a metal supplied from the substrate in contact with the mineralized layer, and normally up to two of M, M' or M" corresponds to an alkali or alkaline earth metal, e.g, calcium, potassium, sodium and mixtures thereof. Without wishing to be bound by any theory or explanation, it is believed that the presence of alkali cations, e.g, M", can influence the presence of other metal ions, e.g., M' supplied from the metal substrate, by an exchange or a replacement mechanism. For example, when the metal substrate comprises zinc and a precursor comprises sodium silicate the crystalline component, which is embedded within the amorphous matrix to form the mineralized layer, comprises $Zn_xNa_yMz(Si2O7)_A(OH)_S{}^*nH_2O$.

The mineralized layer is formed from precursors. By "precursors" it is meant any combination of materials which interact with the metal surface or substrate to form the mineralized layer as well as intermediate products that interact further to form the mineralized layer. Examples of precursors include buffers such as silicate buffers and carbonate buffers including sodium hydroxide; alkali silicates such as at least one of sodium, calcium and potassium silicate; silica; cations supplied or delivered to the surface such as at least one of zinc, molybdenium; ions supplied or delivered to the surface such as at least one of oxygen, sulfur or chlorine from the environment surrounding the precursors or surface; compounds which decompose or react to form a precursor or intermediate thereof; mixtures thereof, among others. Depending upon the precursors, amount thereof and contact conditions, a silica containing layer may form upon the mineralized layer.

The mineralized layer can be tailored by adding one or more dopants to the precursor. Examples of suitable dopants comprise at least one member from the group consisting of anions selected from the group consisting of water soluble salts and/or oxides of tungsten, molybdenum, chromium, titanium, zircon, vanadium, phosphorus, aluminum, iron, boron, bismuth, gallium, tellurium, germanium, antimony, niobium (also known as columbium), magnesium and manganese, mixtures thereof, among others, and more especially, salts and oxides of aluminum and iron. Desirable results can be obtained by adding one or more dopants to a sodium silicate precursor.

The precursors of the mineralized layer are added to any suitable carrier. Examples of suitable carriers include hydrocarbons such as at least one member selected from the group consisting of animal, vegetable, petroleum derived and synthetic oils such as polyalphaolefin (PAO), silicone oil, phosphate esters, fluorinated oils such as KRYTOX (supplied by the DuPont Company). Further examples of suitable carriers comprise at least one member selected from the group consisting of thermoplastic, thermosetting, cross-linked system, mixtures thereof, among others. Specific examples of such carriers include epoxies, acrylics, polyurethanes, silicones, polyesters, alkyds, vinyls, phenolics, fluoropolymers, latexes, mixtures thereof, among others. Depending upon the process conditions, the precursor carrier may be selected from alkylated aromatics, phosphate esters, perfluoroalkylpolyethers, polyesters, olefins, chlorotrifluoroethylene, silahydrocarbons, phosphazenes, dialkylcarbonates, oligomers, polybutenes, and polyphenyl esters, as well as unsaturated polyglycols, silicones, silicate esters, cycloaliphatic hydrocarbons, and dibasic acid esters, e.g., when applying a precursor carrier to an iron containing surface a polyalphaolefin base oil having a kinematic viscosity in the range of about 30–1,400 centistokes at 40° C. can be employed. Other properties to consider when choosing an appropriate polyalphaolefin base oil are molecular weight, molecular branching, thermal stability, and hydrophobicity, depending on the application. The polyalphaolefin base oil can be thickened to a gel with thickeners known to the art of grease manufacturers such as polytetrafluoroethylene or silica. Buffer materials are also suitable as thickeners as long as they are compatible with the base oil. Generally, low molecular weight, synthetic, hydrocarbon oils provide greater ease in designing and manufacturing a gel with particular desired characteristics but are more costly than less refined, high molecular weight, petroleum hydrocarbon oils. Less refined hydrocarbons may also have the disadvantage of containing sulfide compounds which can feed sulfate reducing bacteria and, in turn, tend to corrode metals such as steel, iron and iron alloys.

The carrier film or layer can have a thickness of about 1 to at least about 50 mils, and typically has a thickness of about 1 to about 1.5 mil, e.g., about 0.2 to at least 0.4 mil.

Normally, the carrier is semipermeable thereby permitting anions from the surrounding environment to contact precursors to the mineralized product. By "semipermeable" it is meant to refer to a microporous structure, either natural or synthetic allowing passage of ions, water and other solvent molecules, and very small other molecules. The resin can be essentially insoluble in water and resistant to macro-penetration by flowing water. The resin layers, however, are normally permeable to water molecules and inorganic ions such as metal ions and silicate ions.

The amount of mineralized layer precursor present in the carrier typically comprises about 1 to about 60 wt. % of the carrier, e.g., normally about 5 to about 10 wt. % depending upon the carrier. The mineralized layer precursors can be combined with the carrier in any suitable conventional manner known in this art.

The mineralized layer precursors can include or be employed along with one or more additives such as the pH buffers such as those listed below in Tables A and B, mixtures thereof, among others. In some cases, a buffer also functions as a precursor, e.g., sodium silicate. The amount of these additives typically ranges from about 1 to about 60 wt. % of the carrier, e.g., normally about 5 to about 10 wt. %. These additives can be added to the carrier in order to tailor the characteristics of the mineralized layer, the carrier itself, upon a pre-treated surface, among other characteristics. By adding suitable mineralized layer precursors, carrier, additives, among other materials, the surface of the metal containing layer can be tailored by forming a mineralized layer to possess improved corrosion resistance, adhesion, among other characteristics.

TABLE A

Examples of Buffering Compounds

| Chemical Name | Formula |
| --- | --- |
| Boric Acid | $H_3BO_3$ |
| Citric Acid | $H_3C_6H_5O_7 \cdot H_2O$ |
| Sodium Hydroxide | NaOH |
| Trisodium Phosphate Dodecahydrate | $Na_3PO_4 \cdot 12H_2O$ |
| Potassium Silicate | $SiO_2/K_2O$ 1.6–2.5 wt. Ratio |
| Sodium Silicate | $SiO_2/Na_2O$ 2.0–3.22 wt. Ratio |
| Potassium Hydrogen Phthalate | $KHC_8O_4H_4$ |
| Potassium Dihydrogen Phosphate | $KH_2PO_4$ |
| Borax | $Na_2B_4O_7$ |
| Sodium Hydrogen Carbonate | $NaHCO_3$ |
| Disodium Phosphate Dodecahydrate | $Na_2HPO_4 \cdot 12H_2O$ |
| Sodium Acetate | $NaOOCCH_3$ |
| Disodium Phosphate | $Na_2HPO_4$ |

TABLE B

Examples of Weight Ratios of Buffering Components for Various pH Values

| Desired pH | Weight | Chemical | Weight | Chemical | Weight | Chemical |
| --- | --- | --- | --- | --- | --- | --- |
| 3.0 | 1.00 | Boric Acid | 0.84 | Citric Acid | 0.18 | Trisodium Phosphate |
| 3.5 | 1.00 | Boric Acid | 0.84 | Citric Acid | .027 | Trisodium Phosphate |

TABLE B-continued

Examples of Weight Ratios of Buffering Components for Various pH Values

| Desired pH | Weight | Chemical | Weight | Chemical | Weight | Chemical |
|---|---|---|---|---|---|---|
| 4.0 | 1.00 | Sodium Hydroxide | 196.00 | Potassium | Hydrogen | Phthalate |
| 4.5 | 1.00 | Sodium Hydroxide | 29.30 | Potassium | Hydrogen | Phthalate |
| 5.0 | 1.00 | Sodium Hydroxide | 11.30 | Potassium | Hydrogen | Phthalate |
| 5.5 | 1.00 | Sodium Hydroxide | 6.97 | Potassium | Hydrogen | Phthalate |
| 6.0 | 1.00 | Sodium Hydroxide | 30.40 | Potassium | Dihydrogen | Phosphate |
| 6.5 | 1.00 | Sodium Hydroxide | 12.20 | Potassium | Dihydrogen | Phosphate |
| 7.0 | 1.00 | Sodium Hydroxide | 5.84 | Potassium | Dihydrogen | Phosphate |
| 7.5 | 1.00 | Sodium Hydroxide | 4.14 | Potassium | Dihydrogen | Phosphate |
| 8.0 | 1.00 | Sodium Hydroxide | 3.64 | Potassium | Dihydrogen | Phosphate |
| 8.5 | 1.00 | Boric Acid | 0.84 | Citric Acid | 4.80 | Trisodium Phosphate (12 $H_2O$) |
| 9.0 | 1.00 | Boric Acid | 0.84 | Citric Acid | 5.82 | Trisodium Phosphate (12 $H_2O$) |
| 9.5 | 1.00 | Sodium Hydroxide | 13.55 | | | Borax |
| 10.0 | 1.00 | Sodium Hydroxide | 6.52 | | | Borax |
| 10.5 | 1.00 | Sodium Hydroxide | 5.25 | | | Borax |
| 11.0 | 1.00 | Sodium Hydroxide | 2.31 | | Sodium Hydrogen Carbonate | |
| 11.5 | 1.00 | Sodium Hydroxide | 8.00 | Disodium | Acid Phosphate (12 $H_2O$) | |
| 12.0 | 1.00 | Sodium Hydroxide | 1.30 | Disodium | Acid Phosphate (12 $H_2O$) | |
| 12.5 | 1.00 | Sodium Hydroxide | 15.00 | Disodium | | Acid Phosphate |
| 13.0 | 1.00 | Sodium Hydroxide | 1.00 | Sodium | | Acetate |

The aforementioned carrier can be applied to a metal containing surface by using any expedient method. Depending upon the desired results, the metal containing surface can be applied or reapplied as appropriate. Examples of suitable methods for applying the tailored carrier comprise at least one of painting, spraying, dipping, troweling, among other conventional methods.

By employing a suitable tailored carrier, the instant invention can form a mineralized layer to protect a metal containing surface having at least one member from the group of magnesium, aluminum, vanadium, calcium, beryllium, manganese, cobalt, nickel, copper, lead, copper, brass, bronze, zirconium, thallium, chromium, zinc, alloys thereof, among others. Particularly, desirable results can be obtained when forming a mineralized layer upon a zinc containing surface.

In an aspect of the invention, the metal containing surface comprises zinc which is contacted with a carrier including sodium silicate. The carrier can comprise PAO or polyurethane. The amount of sodium silicate within a PAO carrier typically ranges from about 1 to about 30 wt. %, e.g., about 5 to about 10 wt. %, whereas for a carrier comprising polyurethane the amount of sodium silicate typically ranges from about 1 to about 15 wt. %, e.g., about 5 to about 10 with especially desirable results being obtained at about 6.5 wt. % sodium silicate. When the previously desired carrier is employed, desirable results can be obtained by applying one or more topcoats to the carrier, e.g., polyurethane, polytetrafluoroethylene, mixtures thereof, among others. The topcoat can function as a physical barrier to the surrounding environment thereby providing further corrosion resistance. The thickness of the carrier layer including any topcoat normally ranges from about 0.75 to about at least about 1.5 mils. The corrosion resistance can be further enhanced by heat treating the coated metal surface. That is, after applying a silicate containing carrier to a zinc containing surface and allowing the carrier to incubate, the coated surface is heated (in any suitable atmosphere such as air), to a temperature of about 125 to about 175 C. Consequently, the instant invention permits tailoring the carrier, mineralization precursors, topcoat as well as any heat treatment to obtain a predetermined corrosion resistance, e.g., in the case of a zinc containing surface the ASTM B117 resistance can range from 100 to 3,000 hours.

In an aspect of the invention, the metal containing surface comprises zinc which is contacted with a carrier including sodium silicate. The carrier can comprise PAO or polyurethane. The amount of sodium silicate within a PAO carrier typically ranges from about 1 to about 30 wt. %, e.g., about 5 to about 10 wt. %, whereas for a carrier comprising polyurethane the amount of sodium silicate typically ranges from about 15 wt. %, e.g. about 5 to about 10 with especially desirable results being obtained at about 6.5 wt. % sodium silicate. When the previously desired carrier is employed, desirable results can be obtained by applying one or more topcoats to the carrier, e.g., polyurethane, polytetrafluoroethylene, mixtures thereof, among others. The topcoat can function as a physical barrier to the surrounding environment thereby providing further corrosion resistance. The thickness of the carrier layer including any topcoat normally ranges from about 0.75 to about at least about 1.5 mils. The corrosion resistance can be further enhanced by heat treating the coated metal surface. That is, after applying a silicate containing carrier to a zinc containing surface and allowing the carrier to incubate, the coated surface is heated (in any suitable atmosphere such as air), to a temperature of about 125 to about 175 C. Consequently, the instant invention permits tailoring the carrier, mineralization precursors, topcoat as well as any heat treatment to obtain a predetermined corrosion resistance, e.g., in the case of a zinc containing surface the ASTM B117 resistance can range from 100 to 3,000 hours.

Without wishing to be bound by any theory or explanation, it is believed that the mineralized layer is formed under a variety of chemical and physical forces including 1) transporting ions through the carrier via osmotic pressure and diffusion thereby providing ions to the metal surface, 2) oxygen deprived environment, 3) buffering to provide a predetermined alkaline pH environment that is effective for formation of the mineralized layer upon a given metal surface, e.g, in the case of a zinc containing surface about 9.5 to at least about 10.5 pH, 4) heterogenious process using any available ions, 5) water present at the surface, in the carrier or as a reaction product can be removed via heat, vacuum or solvent extraction, 6) using a reservoir adjacent to the metal surface that can control that ion transport rate as well as the rate of water (and moieties) passing through the reservoir and serve to provide, as needed, a continuous supply mineralized layer precursors, among other forces.

The process for forming the inventive mineralized layer can be initiated by delivering buffering ions of combinations or single component alkali metal polyoxylates (for example sodium silicate) to passivate the metal surface, e.g., refer to item 3) in the previous paragraph. In the case of sodium silicate, the carrier contains dissolved silica in the form of a silicate anion in water as well as sodium oxide in the form of sodium hydroxide in the presence of water. If desired, sodium hydroxide can be employed maintaining the pH of the solution in a range where the silicate can remain soluble. In the case of other substrates and other anion systems, the buffering capacity of the reactants is designed to passivate the surface, manage the pH of the surface chemistry, activate the surface, oxidize the surface, or to prepare or condition the surface for a mineral-forming reaction or any combination of the above. The delivery of ions is through a carrier comprising a membrane employing osmotic pressure to drive precursors to the surface.

The ionic species, which are present in the carrier or that pass through the carrier/membrane, can then interact chemically and can become associated with the surface of the metal to form a submicron mineralization layer, e.g., a monolayer. In the present invention these interactions occur adjacent to or upon the surface of the substrate to form a mineralized layer. It is to be understood that the aforementioned membrane is associated with creating an oxygen-limited passivation environment as part of the mineralization process.

Moreover, the mineralized layer precursors can interact in such a manner to produce mineralized layer in-situ at the surface. Depending upon the conditions of the surface, the substrate may contribute precursors in the form of metal ions. The metal ions of the substrate surface may exist as oxides, or the ions may have reacted with chemical species in the surrounding environment to form other metal species. In the case of a zinc substrate or surface, zinc can oxidize in the environment existing at the surface as zinc oxide, but may also form zinc carbonate from the exposure to carbon dioxide in the air. Under certain conditions, the zinc carbonate will predominate the surface species of the precursor to form the mineralized surface. In the case of other metal substrates, the ability of the surface to contribute ions to function as mineral precursors can be achieved by conditioning the surface, e.g., to populate the surface with oxide species that will participate as mineralized layer precursors.

To enhance mineral layer formation on at least a portion of the surface of a metal substrate, the metal surface may be prepared or pretreated. Metal surfaces normally tend to be covered with a heterogeneous layer of oxides and other impurities. This covering can hinder the effectiveness of the buffering and/or mineral layer formation. Thus, it becomes useful to convert the substrate surface to a homogenous state thereby permitting more complete and uniform mineral layer formation. Surface preparation can be accomplished using an acid bath to dissolve the oxide layers as well as wash away certain impurities. The use of organic solvents and detergents or surfactants can also aid in this surface preparation process. Phosphoric acid based cleaners, such as Metal Prep 79 (Parker Amchem), fall into a category as an example commonly used in industry. Other combinations of acids and cleaners are useful as well and are selected depending upon the metal surface and composition of the desired mineral layer. Once the surface is pretreated, the surface can then be subjected to further activation, if necessary, to enhance the buffering capability, including but not limited to oxidation by any suitable method. Examples of suitable methods comprise immersion in hydrogen peroxide, sodium peroxide, potassium permanganate, mixtures thereof, among other oxidizers.

Depending upon the carrier and process condition, precursors can pass through the carrier membrane system as anions, and interact adjacent to or upon the surface with metal cations, which in most cases are donated by the metal surface or substrate to form a relatively thin mineralized layer, e.g., a monolayer. In one aspect of the invention, sodium silicate (as $SiO_3$—ion) reacts with a zinc containing surface, e.g., that exists primarily as zinc carbonate, to form an amorphous mineralization layer containing a nanocrystaline hemimorphite phase that is normally less than 100 Angstroms in thickness. In this aspect of the invention, the metal surface was prepared for mineralization by the presence of a suitable buffering alkali, e.g., buffering with a silicate to a pH in the range of about 9.5 to about 10.5. While a higher pH can be effectively used, a pH of less than about 11 minimizes the need for certain relatively complex and expensive handling procedures.

In another aspect of the invention, the delivery of pH buffering agents as well as the anion reactants can be designed to tailor the surface characteristic. For example, in order to achieve improved resistance to acid rain on a zinc surface, the silicate anions can be complemented with zirconate anions. Further, in the case of an iron containing surface, the carrier can deliver silicate anions to a anodically conditioned surface to form amorphous phase comprising julgoldite.

In yet another aspect of the invention, a surface pretreatment was used to enhance the mineralization layer formation. For example, in order to achieve an improved corrosion surface on iron, the steel substrate was first treated with a phosphoric acid containing cleaner, then exposed to an oxidizer in order to remove unwanted material and convert at least a portion of the surface to a homogeneous species of iron oxide. The mineralized layer was then formed on the pretreated metal surface by being contacted with sodium silicate containing precursor which in turn can proceed to form a clinopyroxene of sodium iron silicate.

While any suitable buffer can be employed for practicing the invention, buffer solutions are typically prepared by mixing a weak acid and its salt or a weak base and its salt. Acidic buffers, for example, can be prepared using potassium chloride or potassium hydrogen phthalate with hydrochloric acid of appropriate concentrations. Neutral buffers can be prepared by mixing potassium dihydrogen phosphate and sodium hydroxide, for example. Alkaline (basic) buffers can be prepared by mixing borax or disodium hydrogen phosphate with sodium hydroxide, for example. Many more chemical combinations are possible, using appropriate chemicals to establish the proper sequence of proton transfer steps coupled with the intended reactions. Buffer exchange rates may be modified by combinations of buffer materials that react at different ionic exchange rates; buffers of low-change type react more rapidly than high-change types.

Aqueous polymers are preferred carriers for buffers in liquid form and include water-reducible alkyds and modified alkyds, acrylic latexes, acrylic epoxy hybrids, water reducible epoxies, polyurethane dispersions, vinyls and ethylene vinyl acetates, and mixtures thereof. Such polymers are water vapor permeable but are repellent of liquid water and are essentially water insoluble after curing. These polymers can form a semipermeable membrane for water vapor and ionic transfer. Hence, if the surface of the metal substrate is dry, water vapor can permeate the membrane; but, buffering ions, which are present in the membrane or that pass through the membrane, can passivate the metal surface thereby reducing corrosion.

Buffer materials are chosen based on the type of the surface or substrate to be protected. Metal substrates may be protected from corrosion by passivating the substrate surface. Such passivation may generally be accomplished only in certain pH ranges which, in turn, depend on the specific substrate to be protected. For example, iron based alloys are passivated with an alkaline pH (pH 8–12). This pH range is preferably accomplished with sodium silicate and/or potassium silicate powders; but other alkaline materials may be used. A blend of sodium and potassium silicates is also useful for achieving viscosity control in aqueous carrier/membrane formulations.

In a further aspect of the invention, a mineralized layer is obtained by mixing silicates and anodic oxidizing materials such as sodium carbonate and delivering the mixture in a manner effective to activate the metal surface.

While the above description emphasizes a zinc containing surface, the surface of a wide range of metal surfaces can be altered to impart beneficial surface characteristics. In most cases, the substrate or the surface thereof contributes cations to the mineralization-forming reaction. Examples of metal surfaces include aluminum, zinc, iron, copper, brass, iron, steel, stainless steel, lead, alloys thereof, among others. In the case of limited mineral layer formation or thickness of the mineral layer is caused by the surface contribution of the cation, an improved result can be obtained by managing or tailoring the pH. That is, the buffering capacity and the pH of the carrier is substrate surface-specific and is tailored to manage the surface chemistry to form the inventive mineralization layer, e.g., selecting a pH at which the surface is reactive encourages formation of the mineralization layer. The reaction for forming the new surface with continue until such time that the finite quantity of metal atoms at the surface are consumed. If the new mineralized layer is marred or destroyed, a desirable aspect of the instant invention is that the surface will reinitiate mineralization formation with any available precursors. The ability to reinitiate mineralization or self-repair damaged surfaces is a novel and particularly desirable characteristic of the invention.

The delivery/method of the alkali metal polyoxolates (or mineralization layer) can be provided through a membrane from a reservoir as described in the U.S. patent application Ser. No. 08/634,215; previously incorporated by reference. In the present invention, soluble precursors, such as silicate materials, are used within one or more coating layers. For example, in a polymer containing carrier system, one of the layers would be charged with sodium or potassium silicates wherein the outer layer(s) are employed to control the rate of moisture flow through the carrier. These carriers are typically relatively hard films as the normal polymerization of the carrier occurs to form a plastic type polymer type coating. Additional delivery methods have been developed utilizing soft films, gels, sealants, adhesives, and paints wherein the membrane feature is formed in-situ by the reaction between a silicate, e.g., sodium silicate, and silica. By controlling the quantity of the silica in the carrier, the mineralized layer can be designed to suit the specific application. Depending upon the pH and relative concentration of silicate and silica, the degree of crystal formation, e.g., a silica containing hemimorphite within an amorphous layer, can also be designed to achieve a predetermined result.

Without wishing to be bound by any theory or explanation the formation of the mineralized layer can occur under a wide range of conditions (normally ambient) and via a plurality of mechanisms. Normally, the mineralization layer forms underneath the carrier upon the metal surface, e.g., as buried layer under a carrier comprising a reservoir of precursors. If so formed, whatever ions are needed in the reservoir layer to form the mineralized layer, are expediently included as water soluble salts in the reservoir layer. On the other hand, all the ions employed to form the mineralized layer need not necessarily be included in the reservoir layer. That is, if desired cations can be supplied from the underlying metal surface and need not necessarily be included as water soluble salts in the reservoir layer. Such cations can be obtained from the surface of the substrate metal itself, by reaction of the substrate with the anions of the precursor component for the mineralized layer. Since the mineralized layer is normally relatively thin, sufficient cations for the mineralized layer can even be supplied from the substrate when present only as an alloying ingredient, or perhaps even as an impurity. Additionally, the cations needed for the mineralized layer can be supplied from water soluble salts in the reservoir layer, as indicated above. Further, if the mineralized layer is to be formed from an overlying reservoir layer that also contains buffer components, at least some to the salts used for buffering can be employed for forming the mineralized layer. The latter reservoir layer would possess a self healing effect by functioning as a source of minerization precursors in the event the layer was damaged. Once the mineralization layer has been formed to the degree desired, the carrier or reservoir layer can remain as a component of the finished article or removed.

In one embodiment of the invention, silicon can provide the predominate lattice-forming unit, e.g., CRN. The fundamental unit on which the structure of all silicates is based on consists of four $O^{2-}$ at the apices of a regular tetrahedron surrounding and coordinated by one $Si^{4+}$ at the center. A bond between silicon and oxygen atoms may be estimated by use of Pauling's electronegativity concept as 50% ionic and 50% covalent. That is, although the bond typically arises in part from the attraction of oppositely charged ions, the silicon-oxygen bond also involves sharing of electrons and interpretation of the electronic clouds of the ions involved. Each $O^{2-}$ has the potential of bonding to another silicon atom and entering into another tetrahedral grouping, thus uniting the tetrahedral groups through the shared (or bridging) oxygen. Such linking of tetrahedra is often referred to as polymerization. In the case of silicate polymerization, the amount of oxygen is normally less that the stoicheometric amount of 4:1, Si:O. Silicates in which two $SiO_4$ groups are linked can produce $Si_2O_7$ groups which are classed as disilicates. If more than two tetrahedra are linked, a closed ring like structure can be formed of a general composition $Si_xO_{3x}$. Fourfold tetrahedral rings have composition $Si_4O_{12}$. Tetrahedra may also be joined to form infinite single chains, called pyroxenes with a unit composition of $SiO_3$. Infinite double chains, classified as amphibles, normally possess a ratio of Si:O=4:11. Infinitely extending flat sheets are formed of unit composition $Si_2O_5$. Three dimensional framework silicates, such as feldspars or zeolites, typically result in a network oxide of unit composition $SiO_2$.

In the present invention, silicates can be polymerized into a wide range of Si:O ratios. In the case of a zinc containing surface, the surface can interact with a mineral layer precursor to form a disilicate. In the case of an iron containing surface, the surface can interact with a suitable mineral layer precursor to form a chain silicate, e.g., a clinoperoxine. When silicate polymerization occurs in the instant invention, the covalency of the silicon-oxygen bond is decreased. This is evidenced by an increased binding energy of the photoelecton as detected by x-ray photoelectron spectrospopy, e.g, a binding energy between 102.0 to 103.3 eV in comparison to 101.5 eV for orthosilicate.

Without wishing to be bound by any theory of explanation it is also believed that the aforementioned inventive mineralized can comprise a complex oxide of the form:

MxNyOt, wherein "M" represents one or more cationic elements having a covalency factor of less than about 0.5 that functions to balance the charge of the complex oxide, "N" represents one or more lattice forming elements having a covalency factor greater than about 0.15 that functions as the structural component of the complex oxide and optionally wherein the NyOt carries single or multiple crystal structures; and wherein x, y and t comprise any number the total of which balances the charge of the complex oxide. In some cases, the covalency factor of M is less than about 0.33 and the covalency factor N is greater than about 0.33.

Applications for the films and coatings of the invention include, for example, components such as coatings and paints of components, parts and panels for use the automotive industry, home-consumer products, construction and infrastructures, aerospace industry, and other out-door or corrosive applications wherein it is desirable to improve the characteristics of a metal surface and the use of heavy metals in elemental or non-elemental form is environmentally undesirable. The films and coatings may be applied to new products or over conventional platings to extend the useful service life of the plated component.

While the above description places particular emphasis upon forming a silicate containing mineralized layer, one or more mineralized layers having chemically similar or distinct compositions can be applied upon the same metal surface. If desired, the mineralized surface can be further modified by using conventional physical or chemical treatment methods.

The following Examples are provided to illustrate not limit the scope of the invention as defined in the appended claims. These Examples contain results of the following analysis: Auger Electron Spectroscopy (AES), Electronic Impedance Spectroscopy (EIS), and Electron Spectroscopy for Chemical Analysis (ESCA) and Potentiodynamic (DC) Polarization. These analysis were performed using conventional testing procedures. The results of the AES demonstrate that the thickness of the mineralized layer can range from about 10 to 50 microns. EIS demonstrates that the mineralized layer imparts corrosion resistant properties to the surface, e.g., a reduced Icorr corresponds to a reduced corrosion current and in turn a reduced corrosion rate. The XPS data demonstrates the presence of a unique hemimorphite crystal within the mineralized layer, e.g., XPS measures the bond energy between silicon and oxygen atoms and compares the measured energy to standardized values in order to determine whether or not known crystals are present. Conventional X-ray diffraction analysis confirmed that the mineralized layer is predominately amorphous, e.g., an X-ray measurement resulted in wide bands thereby indicating the presence of an amorphous phase.

EXAMPLES

Auger Electron Spectroscopy

Examples 1–4 were prepared and analyzed in accordance with the following AES procedure.

Instrumentation Used

| | |
|---|---|
| Instrument: | Physical Electronics 545, Single Pass Cylindrical Analyzer |
| Sample Excitation: | Electron Gun Emission Current, 1 mA Beam Voltage, 3 kV |
| Electron Beam Detection: | Multiplier Voltage, 1 kV Modulation Voltage, 3 eV |
| Signal Detection: | Lock-in Magnification, 10x Lock-in Time Constant, 0.001 sec. |
| Sputter Gun Settings: | Beam Voltage, 3 kV Focus Dial Setting, 2 Raster X Dial Setting, 10 Raster Y Dial Setting, 10 Emission Current, 15, mA Sputter Rate, 12 Å/min Start Time, 0 min. Final Time, 30 min Sputter Depth, 360 Å |

Example 1

The coating had a first layer with the following formulation (by weight):
25% Water (Fisher Scientific)
75% NeoRezR-9637 (Zeneca Resins)
and a second layer with the following formulation (by weight):
6.5% N-grade Sodium Silicate
13% Water (Fisher Scientific)
80.5% NeoRezR-9637 (Zeneca Resins)
The components were mixed by hand for approximately 15 minutes. The first layer was then cast onto a standard 1010 steel test panel, obtained through ACT Laboratories, with a dry film thickness of about 0.5 to 0.7 mil. This layer was dried to tack free at 60 C for 10 minutes. The second layer was then applied, with a dry film thickness of about 0.5 to 0.7 mil. This layer was also dried to tack free at 60 C for 10 minutes. The second layer was left on the panel for a minimum of 24 hours. Most of the coating was then removed with BIX Stripper (Walmart Stores) and a plastic spatula. The residual coating was washed off with copious amounts of Naptha (Commercial Grade, Walmart Stores), and Reagent Alcohol (Fisher Scientific).

Example 2

The coating had one layer with the following formulation (by weight):
25% Water (Fisher Scientific)
75% NeoRezR-9637 (Zeneca Resins)
and a second layer with the following formulation (by weight)
6.5% N-grade Sodium Silicate
13% Water (Fisher Scientific)
80.5% NeoRezR-9637 (Zeneca Resins)
The components were mixed by hand for approximately 15 minutes. The first layer was then cast onto a standard electrogalvanized test panel, obtained through ACT Laboratories, with a dry film thickness of about 0.5 to 0.7 mil. This layer was dried to tack free at 60 C for 10 minutes. The second layer was then applied, with a dry film thickness of about 0.5 to 0.7 mil. This layer was also dried to tack free at 60 C for 10 minutes. The coating was left on the panel for a minimum of 24 hours. Most of the coating was then removed with BIX Stripper (Walmart Stores) and a plastic spatula. The residual coating was washed off with copious amounts of Naptha (Commercial Grade, Walmart Stores), and Reagent Alcohol (Fisher Scientific).

Example 3

The coating had one layer with the following formulation (by weight):
25% Water (Fisher Scientific)
75% NeoRezR-9637 (Zeneca Resins)
and a second layer with the following formulation (by weight)
6.5% N-grade Sodium Silicate
13% Water (Fisher Scientific)
80.5% NeoRezR-9637 (Zeneca Resins)
The components were mixed by hand for approximately 15 minutes. The first layer was then cast onto a standard zinc phosphated, 1010 steel test panel, obtained through ACT Laboratories, with a dry film thickness of about 0.5 to 0.7 mil. This layer was dried to tack free at 60 C for 10 minutes. The second layer was then applied, with a dry film thickness of about 0.5 to 0.7 mil. This layer was also dried to tack free at 60 C for 10 minutes. The coating was left on the panel for a minimum of 24 hours. Most of the coating was then removed with BIX Stripper (Walmart Stores) and a plastic spatula. The residual was washed off with copious amounts of Naptha (Commercial Grade, Walmart Stores), and Reagent Alcohol (Fisher Scientific).

Example 4

The coating had one layer with the following formulation (by weight):
25% Water (Fisher Scientific)
75% NeoRezR-9637 (Zeneca Resins)
and a second layer with the following formulation (by weight)
6.5% N-grade Sodium Silicate
13% Water (Fisher Scientific)
80.5% NeoRezR-9637 (Zeneca Resins)
The components were mixed by hand for approximately 15 minutes. The first layer was then cast onto a standard iron phosphated, 1010 steel test panel, obtained through ACT Laboratories, with a dry film thickness of about 0.5 to 0.7 mil. This layer was dried to tack free at 60 C for 10 minutes. The second layer was then applied, with a dry film thickness of about 0.5 to 0.7 mil. This layer was also dried to tack free at 60 C for 10 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Each of the previously described washed test panels were passed through an AES analysis in accordance with conventional methods. This analysis confirmed the presence of the inventive mineral layer and generated data which demonstrated that for each substrate, the thickness of the mineralized layer was on the order of about 50 to about 70 Å thick.

Electrical Impedance Spectroscopy

Examples 5 through 13 were prepared for Electrochemical Impedance Spectroscopy (EIS) analysis. EIS is one method of determining corrosion rates of a metal or a coated metal. In this technique, a small-amplitude sinusoidal potential perturbation was applied to the working electrode at a number of discrete frequencies ranging from 60,000 Hz to 0.0005 Hz. At each one of these frequencies, the resulting current waveform exhibited a sinusoidal response that was out of phase with the applied potential signal by a certain amount. The electrochemical impedance was a frequency-dependent proportionality factor that acts as a transfer function by establishing a relationship between the excitation voltage signal and the current response of the system. This method was detailed by the American Society for Testing and Materials (ASTM) in Electrochemical Corrosion Testing, STP 727.

Example 5

A gel was prepared having the following formulation (by weight):
10% Cab-O-Sil TS-720 Silica
90% Amoco DURASYNTM 174 polyalphaolefin
The above formulation was mixed in a Hobart Mixer (model N-50) for approximately 30 minutes. The gel was then cast onto a standard electrogalvanized test panel, obtained through ACT Laboratories, at a thickness of 1/16" to 1/8". The gel was left on the panel for a minimum of 24 hours. Most of the gel was then removed with a plastic spatula. The residual gel was washed off with copius amounts of Naptha (Commercial Grade, Walmart Stores), and Reagent Alcohol (Fisher Scientific).

Example 6

A gel was prepared having the following formulation (by weight):
10% Cab-O-Sil TS-720 Silica
20% G-Grade Sodium Silicate (PQ Corporation)
70% Amoco DURASYN™ 174 polyalphaolefin
The above formulation was mixed in a Hobart Mixer (model N-50) for approximately 30 minutes. The gel was then cast onto a standard electrogalvanized test panel, obtained through ACT Laboratories, at a thickness of 1/16" to 1/8". The gel was left on the panel for a minimum of 24 hours. Most of the gel was then removed with a plastic spatula. The residual was washed off with copius amounts of Naptha (Commercial Grade, Walmart Stores), and Reagent Alcohol (Fisher Scientific).

Example 7

A gel was prepared having the following formulation (by weight):
10% Cab-O-Sil TS-720 Silica
20% Sodium Molybdate (Fisher Scientific)
70% Amoco DURASYN™ 174 polyalphaolefin
The above formulation was mixed in a Hobart Mixer (model N-50) for approximately 30 minutes. The gel was then cast onto a standard electrogalvanized test panel, obtained through ACT Laboratories, at a thickness of 1/16" to 1/8". The gel was left on the panel for a minimum of 24 hours. Most of the gel was then removed with a plastic spatula. The residual was washed off with copius amounts of Naptha (Commercial Grade, Walmart Stores), and Reagent Alcohol (Fisher Scientific).

Example 8

A gel was prepared having the following formulation (by weight):
10% Cab-O-Sil TS-720 Silica
20% Sodium Phosphate (Fisher Scientific)
70% Amoco DURASYN™ 174 polyalphaolefin
The above formulation was mixed in a Hobart Mixer (model N-50) for approximately 30 minutes. The gel was then cast onto a standard electrogalvanized test panel, obtained through ACT Laboratories, at a thickness of 1/16" to 1/8". The gel was left on the panel for a minimum of 24 hours. Most of the gel was then removed with a plastic spatula. The residual was washed off with copius amounts of Naptha (Commercial Grade, Walmart Stores), and Reagent Alcohol (Fisher Scientific).
This Example was repeated with the exception that sodium carbonate was employed instead of sodium phosphate.

Example 9

A coating was prepared having the following formulation (by weight):
25% Water (Fisher Scientific)
75% NeoRezR-9637 (Zeneca Resins)
The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 10

A coating was prepared having the following formulation (by weight):
6.5% N-grade Sodium Silicate
13% Water (Fisher Scientific)
80.5% NeoRezR-9637 (Zeneca Resins)
The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 11

A coating was prepared having the following formulation (by weight):
6.5% Sodium Vanadate Solution (156.3 grams/liter)
13% Water (Fisher Scientific)
80.5% NeoRezR-9637 (Zeneca Resins)
The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 12

A coating was prepared having the following formulation (by weight):
6.5% Sodium Molybdate Solution (274.21 grams/liter)
13% Water (Fisher Scientific)
80.5% NeotezR-9637 (Zeneca Resins)
The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each coat was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 13

A coating was prepared having the following formulation (by weight):
6.5% Sodium Carbonate Solution (120.12 grams/ liter)
13% Water (Fisher Scientific)
80.5% NeoRezR-9637 (Zeneca Resins)
The above formulation was mixed by hand for approximately 15 minutes. The coating was then cast onto a standard 1010 steel test panel, obtained through ACT Laboratories, at a thickness for a total dry film thickness of 2.1 to 2.5 mils in three layers. Each layer was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

The cleaned samples from Examples 5 to 13 were then tested by EIS in accordance with the following method.

| | |
|---|---|
| Instrument: | Solartron 1287 Electrochemical Interface |
| | Solartron 1260 Impedance/Gain-Phase Analyzer |
| | ZWare and CorrWarr Software by Scribner |
| Settings: | 60,000 to .005 Hz. |
| | 10 steps/decade |
| | 5 mV rms AC signal |

Test Solution: 1 Molar Ammonium Sulfate, pH=3.0 (using 0.1 N Sulfuric Acid) for electrogalvanized substrates.

1 Molar Ammonium Sulfate, pH 2.0 (using 0.1 N Sulfuric Acid) for 1010 Steel substrates.

B value: corresponds to the average of the Tafel slope B=(BcBa)/(Bc+Ba) icorr: corresponds to the current generated by corrosion The following Table sets forth the results of the EIS Procedure for the zinc substrate in Examples 5–8.

EIS TABLE FOR ZINC SUBSTRATES

| surface | B | $i_{corr}$ $\mu A/cm^2$ | ave. B | ave. $i_{corr}$ $\mu A/cm^2$ | EXPL NO. | Comments |
|---|---|---|---|---|---|---|
| Bare Zinc | 0.062632 | 193.3 | 0.067255 | 205.5 | standard | |
| | 0.060229 | 204.4 | | | std | |
| | 0.063586 | 226.3 | | | std | |
| | 0.101038 | 85.3 | | | std | 1 |
| | 0.071548 | 213.1 | | | std | |
| | 0.0792307 | 243.6 | | | std | 11 |
| | 0.078282 | 190.2 | | | std | |
| Gel | 0.054997 | 120.4 | 0.055658 | 130.1 | 5 | |
| | 0.045513 | 148.5 | | | 5 | |
| | 0.035642 | 64.3 | | | 5 | |
| | 0.041034 | 79.7 | | | 5 | |
| | 0.039146 | 72.5 | | | 5 | |
| | 0.060190 | 113.1 | | | 5 | |
| | 0.061932 | 138.5 | | | 5 | |
| $Na_2SiO_4$ | 0.072070 | 110.7 | 0.047529 | 97.5 | 6 | |
| | 0.059899 | 121.5 | | | 6 | |
| | 0.035932 | 93.2 | | | 6 | |
| | 0.038235 | 107.7 | | | 6 | |
| | 0.040076 | 67.3 | | | 6 | |
| | 0.038964 | 84.7 | | | 6 | |
| $Na_2MoO_4$ | 0.052667 | 99.3 | 0.061923 | 128.5 | 7 | |
| | 0.072482 | 191.1 | | | 7 | |
| | 0.059900 | 98.5 | | | 7 | |
| | 0.065942 | 128.6 | | | 7 | |
| | 0.058622 | 125.0 | | | 7 | |
| | 0.090991 | 153.9 | | | 7 | 2 |
| $Na_2PO_4$ | 0.047173 | 93.3 | 0.049479 | 153.9 | 8 | |
| | 0.045828 | 141.0 | | | 8 | |
| | 0.053326 | 232.8 | | | 8 | |
| | 0.056754 | 178.1 | | | 8 | |
| | 0.058574 | 194.0 | | | 8 | |
| | 0.035220 | 84.2 | | | 8 | |
| $Na_2CO_3$ | 0.041397 | 68.4 | 0.047339 | 98.7 | 8 | |
| | 0.044320 | 121.8 | | | 8 | 2 |
| | 0.046295 | 81.1 | | | 8 | |
| | 0.057343 | 123.4 | | | 8 | 3 |

[1]Cell leaked at the base, setting up a localized galvanic cell.
[11]Cell leaked underneath gasket.
[2]Cell leaked at the base, discarded this data point.

The results of the EIS indicates that the greatest corrosion resistance (low icorr) for a zinc substrate is obtained by a sodium silicate or sodium carbonate mineral layers.

The following Tables list the corrosion data for the steel surfaces of Examples 9–13.

Coating Without Silicates—Example 9

| surface | Hours Immersed | B (mV) | $R_p$ (ohm-cm$^2$) | $i_{corr}$ ($\mu A/cm^2$) |
|---|---|---|---|---|
| steel | 24 | 39.4 | 68 | 580 |
| — | 49 | 33.8 | 55 | 614 |
| — | 74 | 33.8 | 116 | 290, pH = 2.86 |
| — | 99 | 33.8 | 25 | 1352, pH = 2.0 |
| — | 21 | 34.4 | 54 | 637 |
| — | 44 | 36.3 | 95.8 | 379 |
| — | 68 | 45 | 55.6 | 808, pH = 2.36 |
| — | 1 | 46.1 | 59.3 | 777 |
| — | 24 | 41.7 | 43.8 | 952 |
| — | 48 | 43.3 | 55.5 | 780, pH = 2.4 |
| — | 1 | 42 | 135 | 311 |
| — | 24.5 | 40.8 | 51.8 | 788 |
| — | 48 | 40.5 | 53 | 764, pH = 2.5 |

Coating Containing Sodium Silicate—Example 10

| surface | Hours Immersed | B (mV) | $R_p$ (ohm-cm$^2$) | $i_{corr}$ ($\mu A/cm^2$) |
|---|---|---|---|---|
| steel | 24 | 30.3 | 47.5 | 640 |
| — | 49 | 35.3 | 55 | 642 |
| — | 74 | 35.3 | 267 | 132, pH = 3.15 |
| — | 99 | 35.3 | 20 | 1765, pH = 2 |
| — | 1.5 | 43.4 | 74.4 | 584 |
| — | 21 | 35.5 | 94.2 | 377 |
| — | 44 | 31.5 | 125 | 252 |
| — | 68 | 33.8 | 172 | 196, pH = 225 |
| steel-coated was not completely stripped | 1 | 36.7 | 564 | 65 |
| steel | 26 | 33.2 | 371 | 90 |
| — | 57 | 33.2 | 554 | 60 |
| steel-coating was restripped | 1 | 42.4 | 32.6 | 1300 |
| steel | 1 | 42.2 | 59.7 | 707 |
| — | 24 | 40.8 | 58.7 | 695 |
| — | 48 | 40.8 | 70.2 | 581, pH = 2 |

Coating Containing Sodium Vandate—Example 11

| surface | Hours Immersed | B (mV) | $R_p$ (ohm-cm$^2$) | $i_{corr}$ ($\mu A/cm^2$) |
|---|---|---|---|---|
| steel | 25 | 305.8 | 55.5 | 645 |
| — | 49 | 33.9 | 75.8 | 448 |
| — | 74 | 33.9 | 82.6 | 410, pH = 2.8 |
| — | 78 | 42.2 | 25.7 | 1640, pH = 2 |
| — | 1.5 | 50.5 | 70 | 721 |
| — | 21 | 36.5 | 92 | 397 |
| — | 44 | 33.3 | 126 | 265 |
| — | 68 | 33.2 | 161 | 206, pH = 2.25 |
| — | 1 | 40.8 | 146 | 280 |
| — | 24 | 40.6 | 64.6 | 632 |
| — | 48 | 40.6 | 75.6 | 537, pH = 2 |
| — | 1 | 42.6 | 62.9 | 677 |
| — | 24 | 34.6 | 65 | 536 |
| — | 48 | 39.1 | 110 | 355, pH = 2.1 |

Coating Containing Sodium Molybdate—Example 12

| surface | Hours Immersed | B (mV) | $R_p$ (ohm-cm$^2$) | $i_{corr}$ ($\mu$A/cm$^2$) |
|---|---|---|---|---|
| steel | 21 | 37.4 | 51.3 | 729 |
| — | 44 | 44.4 | 45.6 | 973 |
| — | 68 | 41.4 | 54.3 | 763, pH = 2.35 |
| steel-coating was not completely removed | 1 | 37.7 | 190 | 198 |
| steel | 26 | 36.6 | 138 | 265 |
| — | 57 | 36.6 | 212 | 173 |
| steel-coating was not completely removed) | 1 | 33.3 | 112 | 353 |
| — | 24 | 40.4 | 96.6 | 409 |
| — | 48 | 39.5 | 130 | 293, pH = 2.2 |
| — | 1 | 46.9 | 42.5 | 1109 |
| — | 24 | 48.2 | 28.6 | 1687 |
| — | 44 | 46 | 45.2 | 1018, pH = 2.15 |

Coating Containing Sodium Carbonate—Example 13

| surface | Hours Immersed | B (mV) | $R_p$ (ohm-cm$^2$) | $i_{corr}$ ($\mu$A/cm$^2$) |
|---|---|---|---|---|
| steel | 25 | 37.2 | 82.5 | 451 |
| — | 49 | 27.6 | 123.5 | 223 |
| — | 74 | 27.6 | 128.8 | 214, pH = 2.3 |
| — | 78 | 37.2 | 34.4 | 1080, pH = 2 |
| — | 1 | 41.8 | 56.8 | 735 |
| — | 24.5 | 44.2 | 33.5 | 1320 |
| — | 48 | 43.4 | 40.7 | 1066, pH = 2.9 |
| — | 1 | 39.5 | 112 | 353 |
| — | 24 | 40.6 | 96.6 | 409 |
| — | 48 | 38.1 | 130 | 293, pH = 2.2 |
| — | 1 | 45.7 | 46.7 | 978 |
| — | 24 | 46.5 | 29.7 | 1566 |
| — | 44 | 44.4 | 41.4 | 1072 pH = 2.15 |

Based upon the measured corrosion currents, sodium carbonate and sodium silicate are the most effective in reducing the icorr thereby indicating a reduced corrosion rate.

X-Ray Photoelectron Spectroscopy (XPS)

X-ray Photoelectron Spectroscopy (XPS) was performed on a series of samples in Examples 14–24 that included 1010 Steel and Electrogalvanized Steel. XPS was performed in accordance with conventional procedures in this art.

Instrumentation Used
Instrument: Physical Electronics 5701 LSci
X-ray Source: Monochromatic aluminum
Source Power: 350 watts
Analysis Region: 2 mm×0.8 mm
Exit angle: 65°
Acceptance angle: ±7°
Charge reference: B. E. of C—)H,C)=284.6 eV
Charge neutralization: flood gun
Sampling Depth: (3λ) was 70 Å

Example 14

A coating was prepared having the following formulation (by weight):
25% Water (Fisher Scientific)
75% NeoRezR-9637 (Zeneca Resins)
The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 15

A coating was prepared having the following formulation (by weight):
25% Water (Fisher Scientific)
75% NeoRezR-9637 (Zeneca Resins)
The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C for 15 minutes. The coated panel was then exposed to a post-cure heat treatment of 1 hour at 125° C., using a standard laboratory oven. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 16

A coating was prepared having the following formulation (by weight):
6.5% N-grade Sodium Silicate
13% Water (Fisher Scientific)
80.5% NeoRezR-9637 (Zeneca Resins)
The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 17

A coating was prepared having the following formulation (by weight):
6.5% N-grade Sodium Silicate
13% Water (Fisher Scientific)
80.5% NeoRezR-9637 (Zeneca Resins)
The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C for 15 minutes. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 18

A coating was prepared having the following formulation (by weight):
6.5% N-grade Sodium Silicate
13% Water (Fisher Scientific)
80.5% NeoRezR-9637 (Zeneca Resins)
The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C for 15 minutes. The coated panel was then exposed to a post-cure heat treatment of 125° C. for one hour, in a standard laboratory oven. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 19

A coating was prepared having the following formulation (by weight):
6.5% N-grade Sodium Silicate
13% Water (Fisher Scientific)
80.5% NeoRezR-9637 (Zeneca Resins)
The above formulation was mixed by hand for approximately 15 minutes. The coating was then cast onto a standard electrogalvanized test panel, obtained through ACT Laboratories, for a total dry film thickness of 2.1 to 2.5 mils in three layers. Each layer was dried to tack free at 60 C for 15 minutes. The coated panel was then exposed to a post-cure heat treatment of 175° C. for one hour, in a standard laboratory oven. The coating was left on the panel for a minimum of 24 hours. Most of the coating was then removed with BIX Stripper (Walmart Stores) and a plastic spatula. The residual was washed off with copius amounts of Naptha (Commercial Grade, Walmart Stores), and Reagent Alcohol (Fisher Scientific).

Example 20

For purposes of comparing the results achieved by Examples 14–19, an electrogalvanized panel was soaked for 24 hours in a solution that had the following formulation (by weight):
25 mg/l Sodium Silicate
The sample panel was allowed to air dry.

Example 21

For purposes of comparing the results achieved by Examples 14–19, an electrogalvanized panel was soaked for 24 hours in a solution that had the following formulation (by weight):
25 mg/l Sodium Silicate
The sample panel was allowed to air dry. The panel was then exposed to a post-dry heat treatment of 125° C. for one hour, in a standard laboratory oven.

Example 22

For purposes of comparing the results achieved by Examples 14–19, an electrogalvanized panel was soaked for 24 hours in a solution that had the following formulation (by weight):
25 mg/l Sodium Silicate
The sample panel was allowed to air dry. The panel was then exposed to a post-dry heat treatment of 175° C. for one hour, in a standard laboratory oven.

Example 23

A crystal sample of $Zn_2SiO_4$, which was air fractured and immediately introduced into the sample chamber of the XPS. The total air exposure was less than 2 minutes. The surface was examined initially with a low resolution survey scan to determine which elements were present. High resolution XPS spectra were taken to determine the binding energy of the elements detected in the survey scan. The quantification of the elements was accomplished by using the atomic sensitivity factors for a Physical Electronics 5701 LSci ESCA spectrometer.

The following Table sets forth the silicon binding energies which were measured for Examples 14–23.

| Example Number | Treatment | Si 2p peak Energy (eV) |
| --- | --- | --- |
| 14 | Room Temp | 101.9 |
| 15 | 125° C. | 101.8 |
| 16 | Room Temp | 102.8 |
| 17 | Room Temp | 102.8 |
| 18 | 125° C. | 102.6 |
| 19 | 175° C. | 102.6 |
| 20 | 25 ppm $Na_2SiO_4$, 25° C. | 101.7 |
| 21 | 25 ppm $Na_2SiO_4$, 125° C. | 101.7 |
| 22 | 25 ppm $Na_2SiO_4$, 175° C. | 101.8 |
| 23 | $Zn_2SiO_4$ crystal | 101.5 |

The above Table illustrates that there has been a change in the concentration of Si as well as the bond energy thereby providing further confirmation of the presence of the mineralized layer. Further, the Si-O bond energy of conventional zinc silicate crystal as well as the silicate soaked panels is distinct from the inventive mineralized layer.

Example 24

A coating was prepared having the following formulation (by weight):
6.5% N-grade Sodium Silicate
13% Water (Fisher Scientific)
80.5% NeoRezR-9637 (Zeneca Resins)
The formulation above was mixed by hand for approximately 15 minutes. The coating was then cast onto a standard electrogalvanized test panel, obtained through ACT Laboratories, for a total dry film thickness of 2.1 to 2.5 mils in three coats. Each coat was dried to tack free at 60 C for 15 minutes. The panel was exposed to ASTM B 117 Salt Fog Chamber for 2400 hours. At the end of the salt fog exposure, there were large areas of the panel that were uncorroded. The area of uncorroded surface was cut into a small square sample and the urethane coating was removed by hand, using small tweezers. The sample was analyzed in accordance with the previously identified XPS method on an instrument of comparable sensitivity and accuracy. The results of the XPS are set forth in the following Table.

Example 24 Silicate Containing Coating Followed by Salt Spray Exposure

| Example Number | Treatment | Si 2p peak Energy (eV) | Relative Concentration of Silicon on the Surface (% wt) |
|---|---|---|---|
| 14 | urethane coating, room temp | 101.9 | negligible at 1.0% |
| 15 | urethane coating, 125° C. | 101.8 | negligible at 0.8% |
| 16 | silicate, room temp | 102.8 | 19.8% |
| 17 | silicate 125° C. | 102.8 | 18.9% |
| 18 | silicate, room temp | 102.6 | 15.8% |
| 19 | silicate, 175° C. (heat applied after coating removed) | 102.6 | 11.6% |
| 20 | immersion, 25 ppm $Na_2SiO_4$, 25° C. | 101.7 | 4.1% |
| 21 | immersion, 25 ppm $Na_2SiO_4$, 125° C. | 101.7 | 3.2% |
| 22 | immersion, 25 ppm $Na_2SiO_4$, 175° C. | 101.8 | 3.9% |
| 23 | $Zn_2SiO_4$ crystal | 101.5 | NA |
| 24 | silicate, room temp, 2400 hours of B117 exposure | 102.6 | 8.1% |

The above Table illustrates that the binding energy for the surface exposed to the silicate containing coatings range from 102.6 to 102.8. By observation of the XPS peak, it was observed that these energy values were actually manifold values from manifold peaks that contain more than one material. These materials can be characterized as a disilicate, or hemimorphite (bonding energy at 102.2), altered by the presence of Si—O bonds, as in SiO2 (bonding energy at 103.3) and Si—O—C bonds with a bonding energy of 103.6 or 103.7. Such a bonding energy and concentration of Si on the surface are distinct from conventional silica or silicate structures. The binding energy, for zinc silicate, $Zn_2SiO_4$, 101.5 eV, is also distinct from the binding energy of the mineralized layer, 102.7 eV, or the hemimorphite.

Example 25

This Example illustrates a process for pretreating a metal surface in order to enhance formation of the inventive silicate containing layer/surface.
1. Immerse panel in solution of 25% Metalprep 79 (Parker-Amchem) for 2 minutes,
2. Remove Panel and rinse with deionized water,
3. Scrub panel gently with "Kim-Wipe",
4. Rinse with deionized water and wipe off excess with Kim-wipe,
5. Immerse panel in 0.1 M NaOH solution for 10 sec.,
6. Wipe off excess with Kim-wipe,
7. Immerse panel in 50% H202 solution for 5 min.; and,
8. Wipe off excess with Kim-wipe.

Example 26

A cold rolled steel panel (ACT Labs) was prepared with the pretreatment process described in Example 25. The pretreated panel was then coated with a first layer comprising the following formulation (by wt %):
25% Water (Fisher Scientific); and,
75% NeoRezR-9637 (Zeneca Resins).

A second and third layer comprising the following formulation were then applied upon the first layer (by weight):
13% N-grade Sodium Silicate,
6.5% Water (Fisher Scientific); and,
80.5% NeoRezR-9637 (Zeneca Resins).

Each aforementioned formulation was mixed by hand for approximately 10 minutes. Each layer was applied at a 1.2 mil wet film thickness and cured for 15 minutes at 60 C to form for a tack-free finish. The panels were allowed to set overnight (or longer) and the coating was physically removed by hand.

XPS analysis was performed on the surface of this panel. The characteristic NaFe $(SiO_3)_2Si(2p)$ photoelectron binding energy was used to identify the species on the surface. The surface was characterized as a iron pyroxene species with the empirical formula of $NaFe(SiO_3)2$. Comparison of a clinopyroxene, a naturally occurring iron pyroxene, indicates that the species on the surface of the panel is indeed a matrix of a polymerized $SiO_3$ and iron.

Example 27

A electrozinc galvanized panel (ACT Labs) was prepared with the pretreatment method described above in Example 25. The panel was then coated with the following first formula (by wt %):
25% Water (Fisher Scientific); and,
75% NeoRezR-9637 (Zeneca Resins).

A second and third layer with the following formulation (by weight) were applied upon the first layer:
6.5% N-grade Sodium Silicate,
13% Water (Fisher Scientific); and,
80.5% NeoRezR-9637 (Zeneca Resins).

Each formula was mixed by hand for approximately 10 minutes. Each layer was applied at a 1.2 mil wet film thickness and given a 15 minute 60 C cure to allow for a tack-free finish. The panels were allowed to set for 1 hour and the coating was physically removed by hand.

Example 28

A electrozinc galvanized panel (ACT Labs) was prepared with the pretreatment method described in Example 25. The panel was then coated with two layers of the following formula (by wt %):
1.0% N-grade Sodium Silicate,
18.5% Water (Fisher Scientific); and,
80.5% NeoRezR-9637 (Zeneca Resins).

Each formula was mixed by hand for approximately 10 minutes. Each layer was applied at a 1.2 mil wet film thickness and given a 15 minute 60 C cure to allow for a tack-free finish. The panels were allowed to set for 24 hours and the coating was physically removed by hand.

The coated galvanized panels were recovered and analyzed in accordance with the previously described ESCA/XPS methods. XPS analysis was performed on both panels. A first panel shows the Si(2p) photoelectron binding energy of 102.1 eV representing a zinc disilicate species. A second panel also shows the same binding energy at 102.1 eV also indicating the presence of a zinc disilicate species on the surface of the zinc. The second test panel also has significantly more silica on the surface, represented by the 103.3 eV binding energy than does the first panel. Because of the accumulation of silica on the surface of panel #2, the relative amount of zinc decreases due to the limited sampling depth of XPS. The Zn:Si ratio goes down from 2.0 to 0.43 on panel #1 to panel #2, respectively, as would be expected when the build up of silica increases on the panel surface. In both cases, the formation of a zinc disilicate protective species was detected.

Example 29

Cold rolled steel panels (ACT Laboratories) were coated with the following formula (by wt %) to form a first layer:
25% Water (Fisher Scientific); and,
75% NeotezR-9637 (Zeneca Resins).

A second layer with the following formulation (by wt %) was applied upon the first layer:
X % N-grade Sodium Silicate,
(19.5-X) % Water (Fisher Scientific); and,
80.5% NeoRezR-9637 (Zeneca Resins),
wherein X is a number, either 1.0 or 0.01 wt. %, as described below. A second layer with the same composition of the first layer was applied. Each formula was mixed by hand for approximately 10 minutes. Each layer was applied at a 1.2 mil wet film thickness and given a 15 minute 60 C cure to allow for a tack-free finish. Each panel was given a heat treatment for 1 hour at the temperature described in the table below. The panels were allowed to set overnight.

| Panel Set # | Silicate conc (X %) | Heat temp (C.) | B2247 fail time Humidity | Adhesion rating |
|---|---|---|---|---|
| 1 | 0.01 | 60 | 8 | 1 |
| 2 | 0.01 | 125 | 8 | 9 |
| 3 | 1.0 | 60 | 24 | 1 |
| 4 | 1.0 | 125 | 24 | 10 |

Two sets of tests were performed to examine the degree of protection against corrosion and the adhesion properties of the urethane coating to the steel surface. Corrosion protection was measured by time to reach 5% red rust coverage by humidity exposure according to ASTM B2247. Adhesion was measured by immersing the panels in deionized water for 10 minutes followed by 24 hour humidity exposure. The panel coatings were then scribed using a razor blade in a "X" pattern. Tape was placed over the scribe and pulled back. Performance was rated on a scale of 1–10, 1=no adhesion and complete removal of coating, 10=excellent adhesion, no removal of coating.

The results, illustrated in the table above, show that increased loadings of silicate in the urethane coating improve corrosion protection. For best results, the amount of mineral layer precursor or sodium silicate is greater than 0 and less than about 7 wt. %, normally about 0.1 to about 0.01 wt/% silicate, and heat treated at a temperature of about 125 C.

It is to be understood that the foregoing is illustrative only and that other means and techniques may be employed without departing from the spirit or scope of the invention as defined in the following claims.

Example 30

The corrosion resistance of the following formulations were evaluated by salt spray testing per ASTM-B 117 specifications with the panels positioned with the 6 inch long edge at the top and the bottom to preclude each of the test areas on each panel from affecting the adjacent area.
The coating formulations were prepared as follows:

1. Formula #1: was prepared by adding 781 g. water to 2342 g. NeoRez R9637 polyurethane dispersion (Zeneca Resins) to achieve a composition of 75% by weight R9637 and 25% by weight water. The viscosity of the composition was 35 cP Brookfield (#2 spindle, speed 20, 70° F.).
2. Formula #2: was prepared by diluting 143.5 mL N grade sodium silicate solution (PQ Corporation) with 345 mL distilled water and slowly mixing this into 2134.5 grams of NeoRez R9637 resin while stirring with an air powered Jiffy Mixer for approximately 15 minutes. The viscosity of the composition was 38 cP Brookfield (#2 spindle, speed 20, 70° F.) and had a pH of 10.5 (pH paper).

The coatings formulations were used to coat electrogalvanized steel panels and hot-dipped galvanized zinc panels. The electrogalvanized panels were supplied by ACT (ACT E60 EZG 60G) 2 side, clean, unpolished. The hot-dipped galvanized panels were obtained from a metal building supplier (Bulter) and cut to size specifications. Each coating layer was applied with a #12 Jr. Drawdown rod to produce a 1.2 mil wet film coating thickness. Each coating layer was dried to a tack free condition by baking in a forced air convection oven at 60 C for 15 minutes before subsequent coating layers were applied. The overall dry film coating thickness on all of the panels averaged 1.4 mils.

Sample 1:
Sample Name: Egal Control Sample
Substrate: ACT E60 EZG 60G 2 Side E-Galv., clean, unpolish zinc coated panel.
Coating: None (control sample)
Additional Treatments: None Sample 2:
Sample Name: Hot-dipped Control Sample
Substrate: HotDipped Zinc Panel 03X06X075
Coating: None
Additional Treatments: None Sample 3:
Sample Name: Urethane Control Sample
Substrate: ACT E60 EZG 60G 2 Side E-Galv., clean, unpolish zinc coated panel.
Coating: 3 coats of Formula #1
Additional Treatments: None Sample 4:
Sample Name: Heated Urethane Control Sample
Substrate: ACT E60 EZG 60G 2 Side E-Galv., clean, unpolish zinc coated panel.
Coating: 3 coats of Formula #1
Additional Treatments: 75° C. for 1 hour Sample 5:
Sample Name: Single Formula #2 Coat
Substrate: ACT E60 EZG 60G 2 Side E-Galv., clean, unpolish zinc coated panel.
Coating: 1 coat of Formula #2
Additional Treatments: None Sample 6:
Sample Name: Single Formula #2+Topcoat
Substrate: ACT E60 EZG 60G 2 Side E-Galv., clean, unpolish zinc coated panel.
Coating: 1 coat of Formula #2, than 1 coat of Formula #1
Additional Treatments: None Sample 7:
Sample Name: 2-layers of Formula #2
Substrate: ACT E60 EZG 60G 2 Side E-Galv., clean, unpolish zinc coated panel.
Coating: 2 coats of Formula #2
Additional Treatments: None Sample 8:
Sample Name: Single layer of Formula #2+Topcoat
Substrate: HotDipped Zinc Panel
Coating: 1 coat of Formula #2, than 1 coat of Formula #1
Additional Treatments: None Sample 9:
Sample Name: 3-layer Formula #2
Substrate: ACT E60 EZG 60G 2 Side E-Galv., clean, unpolish zinc coated panel.

Coating: 3 coats of Formula #2
Additional Treatments: None
Sample 10:
Sample Name: 3-layers of Formula #2
Substrate: HotDipped Zinc Panel.
Coating: 3 coats of Formula #2
Additional Treatments: None
Sample 11:
Sample Name: 2 layers of Formula #2+Topcoat
Substrate: ACT E60 EZG 60G 2 Side E-Galv., clean, unpolish zinc coated panel.
Coating: 2 coat of Formula #2, than 1 coat of Formula #1
Additional Treatments: None
Sample 12:
Sample Name: 2 layers of Formula #2+Topcoat
Substrate: HotDipped Zinc Panel.
Coating: 2 coat of Formula #2, than 1 coat of Formula #1
Additional Treatments: None
Sample 13:
Sample Name: 2 layers of Formula #2+Topcoat+Heat
Substrate: ACT E60 EZG 60G 2 Side E-Galv., clean, unpolish zinc coated panel.
Coating: 2 coat of Formula #2, than 1 coat of Formula #1
Additional Treatments: 75° C. for 1 hour
Sample 14:
Sample Name: 2 layers of Formula #2+Topcoat+Heat
Substrate: ACT E60 EZG 60G 2 Side E-Galv., clean, unpolish zinc coated panel.
Coating: 2 coat of Formula #2, than 1 coat of Formula #1
Additional Treatments: 175° C. for 1 hour The results of analyizing the above Samples in accordance with ASTM B117.

| Sample No. | Substrate | Performance Hours ASTM B117 | |
|---|---|---|---|
| | | 1st Red | 5% Red Rust |
| 1 | Zinc Egalv Control | 24 | 120 |
| 2 | Zinc Hot-dipped Control | 24 | 528 |
| 3 | Urethane Control | 320 | 452 |
| 4 | Heated Urethane Control | 384 | 672 |
| 5 | Single Layer | 864 | 1080 |
| 6 | Single Layer + Topcoat | 876 | 1100 |
| 7 | 2-Layer | 1288 | 1476 |
| 8 | Single Layer + Topcoat | 1308 | 1500 |
| 9 | 3-Layer | 1206 | 1320 |
| 10 | 3-Layer | 1200 | 1300 |
| 11 | 2-Layer + Topcoat | 1336 | 1608 |
| 12 | 2-Layer + Topcoat | 2000 | 2400 |
| 13 | 2-Layer + Topcoat + Heat | 2300+ | 2600+ |
| 14 | 2-Layer + Topcoat + Heat | 2500+ | 3000+ |

The above Table illustrates that the instant invention can be employed for increasing the corrosion resistance of a zinc containing surface by a factor of at least 8, e.g, compare samples 4 and 14.

Example 31

This Example illustrates whether or not corrosion resistance is imparted by an alkaline pH (attributed to Sodium Hydroxide) and whether the presence of the soluble silicate ion offers any additional protection beyond the contribution of the alkaline pH.

This Example was performed by preparing and testing three sets of formulations:
1. 3 layers of polymer with no additives.
2. 3 layers of water-borne polymer with a pH adjusted to that of a alkali silicate doped coating.
3. 3 layers of polymer with sodium silicate added.

The coating formulations were prepared as follows:
1. The coating for formulation 1. was prepared by adding 781 g. water to 2342 g. NeoRez R9637 polyurethane dispersion (Zeneca Resins) to achieve a composition of 75% by weight R9637 and 25% by weight water. The viscosity of the composition was 35 cP Brookfield (#2 spindle, speed 20, 70° F.).
2. The coating for formulation 2. was prepared by dissolving 2.4335 g. NaOH (sodium hydroxide powder) in 41.2 G. of distilled water. This sodium hydroxide solution was slowly mixed into 254 g. NeoRez R9637 resin with an air powered Jiffy Mixer over the course of 5 minutes. The viscosity of the composition was 60 cP Brookfield (#2 spindle, speed 20, 70° F.) and had a pH of 10.5 (pH paper).
3. The coating for formulation 3. was prepared by diluting 143.5 mL N grade sodium silicate solution (PQ Corporation) with 345 mL distilled water and slowly mixing this into 2134.5 grams of NeoRez R9637 resin while stirring with an air powered Jiffy Mixer for approximately 15 minutes. The viscosity of the composition was 38 cP Brookfield (#2 spindle, speed 20, 70° F.) and had a pH of 10.5 (pH paper).

The coating formulations were used to coat electrogalvanized steel panels. The electrogalvanized panels were ACT E60 EZG 60G 2 side, clean, unpolished from APR 29396 Batch 30718614. Each coating layer was applied with a #12 Jr. Drawdown rod to produce a 1.2 mil wet film coating thickness. Each coating layer was dried to a tack free condition by baking in a forced air convection oven at 60 C for 15 minutes before subsequent coating layers were applied. The overall dry film coating thickness on all of the panels averaged 1.4 mils. The following panels were prepared:

| surface | First Layer | Second Layer | Third Layer | alkali |
|---|---|---|---|---|
| Egalv | Formula #1 | Formula #1 | Formula #1 | PANTST27 |
| Egalv | Formula #3 | Formula #3 | Formula #3 | ConNaOH |
| Egalv | Formula #2 | Formula #2 | Formula #2 | Zn—NaOH |

Five panels each having the surface and layering shown in the above Table were subjected to ASIM-B 117 salt spray exposure until all panels in the group developed red corrosion on 5% of its surface, or approximately 1500 hours of test exposure was achieved. The average time in test hours to the development of first red corrosion and to development of red corrosion on 5% of each sample surface(Failure) is shown in the Table below:

| AVERAGE SALT SPRAY RESULTS FOR ELECTROGALVANIZED STEEL PANELS | | |
|---|---|---|
| Coating Formulation | Avg Hours First Red | Avg Hours 5% Red (Fail) |
| Polyurethane Only | 308 | 448 |
| Polyurethane pH Adjusted | 456 | 616 |
| Polyurethane + Na Silicate | 1176* | 1336** |

*Two test panels did not develop red corrosion during the ASTM B117 Test.
**Two test panels did not develop red corrosion during the ASTM B117 Test.

The above two Tables illustrate that when applied over electrogalvanized steel panels, polyurethane coatings which contain sodium silicate perform a minimum of three times better than the polyurethane coating by itself, whereas only a 1.5 times improvement can be obtained by adjusting the polyurethane coating pH to 10.5. The presence of the sodium silicate imparts a corrosion resistance benefit significantly greater than that arising from the alkaline pH.

Example 32

The purpose of this Example is to determine the effect on corrosion resistance of adding different loadings of G grade sodium silicate powder (PQ Corporation) to a urethane carrier.

The 1,5,10,15,20,25,30 wt. % sodium silicate batches were prepared by adding 2,10,20,30,40,50,and 60 grams, respectively, of G grade sodium silicate powder(PQ Corporation) to 200 grams of PAO Grease(AM940126 supplied by Nye Lubricants Inc.) and mixing by hand for approximately 30 minutes.

The mixed silicate containing grease was evaluated by applying the grease upon ACT E60 EZG 60G 2 Side E-Galv., clean, unpolish zinc coated panels. The grease was applied to the panels by applying an excess to the panels and running a gate type applicator across the panels to leave behind a 1/16 inch thick gel coating. Two panels were coated per substrate/grease loading.

Prior to testing, the grease was removed from the bottom 3–3.5 inches of the panels by lightly scraping the excess off with manilla tags, leaving a thin film of gel on the surface. The base oil of the gel was then removed from this thin film by soaking and rinsing with naphtha. The cleaned surface of the panels appeared to be covered with a thin white deposit postulated to be silica and sodium silicate. Each test panel consisted of an uncoated area approximately 1 inch wide at the hole end of the panel followed by a 1.5–2 inch width containing unremoved gel and finally containing a 3–3.5 inch wide area where the gel had been removed.

The panels were evaluated by salt spray testing per ASTM-B117 specifications with the panels positioned with the 6 inch long edge at the top and the bottom to preclude each of the test areas on each panel from affecting the adjacent area.

| Wt % silica | test basis | Salt Spray Hours (ASTM B117) | | |
|---|---|---|---|---|
| | | Panel 1 | Panel 2 | Average hours |
| 0 | First Red | 480 | 672 | 576 |
| | 5% Red | 648 | 1224 | 936 |
| 1 | First Red | 504 | 816 | 660 |
| | 5% Red | 792 | 1248 | 1020 |
| 5 | First Red | 1296 | 1320 | 1308 |
| | 5% Red | 2064 | 1872 | 1968 |
| 10 | First Red | 1320 | 1368 | 1344 |
| | 5% Red | 1584 | 1536 | 1560 |
| 15 | First Red | 1176 | 1176 | 1176 |
| | 5% Red | 1416 | 1536 | 1476 |
| 20 | First Red | 768 | 1200 | 984 |
| | 5% Red | 1080 | 1416 | 1248 |
| 25 | First Red | 1152 | 1200 | 1176 |
| | 5% Red | 1416 | 1416 | 1416 |
| 30 | First Red | 1152 | 1200 | 1176 |
| | 5% Red | 1320 | 1416 | 1368 |

The corrosion resistance of zinc coated panels was affected by the amount of silicate in the carrier. The above Table demonstrates that the presence of at least 1% sodium silicate significantly enhances the corrosion performance.

Example 33

Electrozinc galvanized steel panels (ACT Laboratories) were coated with two layers of the following formula (by wt %)
X % N-grade Sodium Silicate,
(19.5-X) % Water (Fisher Scientific); and,
80.5% NeoRezR-9637 (Zeneca Resins),
wherein X is a number, either 1.0, 0.1, or 0.01, as described below in greater detail. A final layer with the same composition of the first layer was applied. Each formula was mixed by hand for approximately 10 minutes. Each layer was applied at a 1.2 mil wet film thickness and given a 15 minute 60 C cure to allow for a tack-free finish. The panels were allowed to set overnight.

Two sets of tests were performed on these panels to examine the degree of formation of a zinc disilicate protective species and the adhesion properties. XPS analysis was performed on the panels with the urethane layer removed. The Si(2p) photoelectron binding energy signature of 102.1 eV representing the zinc disilicate protective species was examined to determine its presence. Adhesion was measured by immersing the panels in deionized water for 10 minutes followed by 24 hour humidity exposure. The panel coatings were then scribed using a razor blade in a "X" pattern. Tape was placed over the scribe and pulled back. Performance was rated on a scale of 1–10, 1=no adhesion and complete removal of coating, 10=excellent adhesion, no removal of coating.

| Panel Set # | Silicate conc (X %) | Formation of Zinc Disilicate | Adhesion rating |
|---|---|---|---|
| 1 | 1.0 | Yes | 10 |
| 2 | 0.1 | Yes | 10 |
| 3 | 0.01 | No | 10 |

All panels show excellent adhesion of the urethane layer to the surface of the zinc substrate. A silicate concentration of aoubt 0.01 wt % in the urethane formula used above does Mi not allow for the formation of zinc disiliicate on the surface of the zinc.

Example 34

This Example illustrates the partial mineral formation on zinc galvanized surfaces. The zinc surface was prepared under controlled conditions to capture the formation process at different stages and was analyzed using ESCA, AFM, and salt spray exposure in order to correlate formation to salt spray performance. Testing illustrated that there is a correlation between hemimorphite formation and salt spray performance. The data also shows a possible reaction pathway.

The purpose of this experiment was to control the formation of the zinc silicate species on the surface. When the protective species possess the characteristic peak, the intensity should correlate to the degree of corrosion protection. The intensity of the peak was affected by the thickness of the zinc silicate formed and/or the percent coverage of the surface. Thicker coverage prolonged corrosion protection however, incomplete coverage produced immediate failure. To slow down the mineral layer formation rate on the surface, three techniques were employed. The first was to lay down a "non-active" urethane coat (one without any silicate). When the active layer is applied, the silicate will then have a barrier of diffusion to migrate through slowing down the rate of reaction. The next technique was to apply active coatings with lower amounts of silicate done under the assumption the reaction rate is dependent upon this reactant. The last method was to remove the coating at different times, thus stopping the reaction at known times.

Electrozinc galvanized panels were obtained from ACT Laboratories (EZG 60G). Each panel was washed with reagent alcohol to remove any oils. The panels were coated based on the scheme showed below in table 1. The three factors being studied are the number of base coats (0 or 1), the concentration of the silicate used in the urethane layer (1% or 6.5%), and time of coating removal (1 hr or 2 days). Each factor and the recipe matrix is shown in table 1. Each panel will be coated with or without the base coat as called for by the experimental matrix. The panel was then be coated with two layers of the active coat using the specified concentration. Coating was done using a #12 draw down bar. Each coat was cured for 15 minutes at 60 C. The removal of the coating was done by applying an excessively thick coating of urethane. This was done to increase tensile strength of the coating to facilitate the easy removal of the coating.

The base resin used for all the coatings was NeoRez R9637 (Zeneca). Resin concentration was held at 80.5 wt %. The appropriate amount of N-grade sodium silicate solution (PQ) was diluted and slowly added into the resin while stirring. Concentrations of the silicate solutions before dilution were 0,1, or 6.5 wt %. The solution was then topped off with water.

Samples were tested in accordance with the previously described ESCA analysis techniques. The results of the ESCA testing are set forth in the following table.

| Panel | Strategy | Si(2p) | Species | Zn:Si |
|---|---|---|---|---|
| 4 | 0-2-0 48 hrs, 6.5% | 103.2 | silica | 0.26 |
| 3 | 0-2-0 48 hrs, 1% | 102.0 (60%) 103.1 (40%) | disilicate silica | (0.4 ± 0.1) |
| 2 | 1-2-0 48 hrs, 6.5% | 102.1 (83%) 103.3 (17%) | disilicate silica | 1.07 |
| 1 | 1-2-0 2 hrs, 6.5% | 101.6 | orthosilicate | 2.63 |
| Willemite | | 101.3 | orthosilicate | 2.0 |
| Hemimorphite | | 101.8 | disilicate | 2.0 |

The Table shows the progression of formation on the zinc surface. Panel 1 shows the initial formation of a zinc orthosilicate species. As time progresses, the zinc disilicate became the predominate species on the surface as seen in panel 2. Also the presence of silica was seen in relatively low yields. As the reaction progresses, the relative amount of silica increased until it overshadows the whole spectra as seen in panel 4. The increasing amount of silica does not indicate a lower yield of zinc disilcate. The ESCA analysis in limited to the top 50 angstroms of a surface. The trend of the zinc to silicon ratio illustrated that there was an accumulation of silica as the ESCA did detect the zinc due to the increased levels of silica. Natural examples of orthosilicate and disilicate known as Willemite and Hemimorphite respectively, were tested for purposes of comparison. The binding energies show a 0.3 eV shift compared to the test panels. This was due to the presence of sodium ions which has been detected by ESCA. The presence of sodium ions decreased the covalency of the Si-O bond thus increasing the binding energy.

Example 35

The purpose of this Example is to demonstrate using potentiodynamic (DC) polarization to measure corrosion resistance of a mineralized layer.

The initial corrosion resistance on treated metal substrates (as described below in greater detail) were measured via the following electrochemical polarization method. The tests were performed utilizing a Solartron SI 1287 electrochemical interface connected to an electrochemical cell similar to that shown in ASTM-G5-87. The working electrode consisted of a 2 cm×7.5 cm test panel held by a stainless steel alligator clip with copper wire attached to the alligator clip. The assembly was maintained in a stationary position by holding the alligator clip tight against the end edge of a 13 mm inside diameter glass tube with the wire attachment running up the inside of the tube and the clamping lever arm extending outside of the tube. The tube was fitted to the glass flask by running it through a rubber stopper and the wire was held tight within the glass tube by running it through a rubber stopper at the top end of the glass tube. The sample to be tested was positioned so that the alligator clip connection to the test panel does not contact the cell test solution. The counter electrode was a standard platinum electrode and the reference electrode was a standard saturated calomel electrode connected to the test cell via a salt bridge. Tests were performed at ambient lab conditions of 70 F.

The DC polarization tests were performed by adding 700 mL of 5.0 weight % sodium chloride solution to the flask and aerating vigorously with compressed air for 30 seconds. The aeration rate was the reduced to bubbling at 60 mL per minute. The counter electrode, salt bridge, and reference electrode were then put in place. The sample substrate was prepared by applying a nonconductive, non-dissolving gel (Nyogel 759G, Nye Lubricants, Inc.) on the back, edges, and part of the front of the panel to leave a 2 cm×2 cm test area uncoated for the polarization test. Finally the test sample (working electrode) was placed in the cell and positioned approximately 2–3 mm from the tip of the salt bridge. The cell potential vs. Open circuit was monitored to determine when a steady value was reached (approximately 15–30 minutes) via monitoring by CorrWare for Windows, Version 1.4 software (Scribner Associates, Inc. Charlottesville, Va.). After the steady state cell potential was achieved, a potentiodynamic polarization scan was performed by scanning from −0.2 mV to +0.2 mV from the steady state cell potential(Ecorr) vs. Open circuit potential. A scan rate of 10 mV/sec was utilized. The relatively fast scan rate was necessary to complete the anodic portion of the scan before enough zinc had dissolved from the surface to expose the underlying steel base material. The scanning software recorded one data point (current density in A/sq. cm) at each millivolt. Calculations were made utilizing CorrView for Windows version 1.4 software (Scribner Associates, Inc. Charlottesville, Va.) which both plotted the data (Potential in volts versus Log Current Density in A/sq. cm) , determined anodic (Ba) and cathodic (Bc) Tafel slope constants, and calculated the corrosion current (Icorr) density (intersection of the anodic and cathodic Tafel lines).

The following 4 samples were evaluated:

a). Panel #639 was an electrogalvanized steel panel (ACT E60 EZG 60G 2-side, clean, unpolished, 3"×6"×0.030") was rinsed with reagent alcohol and coated with a resin which consisted of:

80.5% by weight NeoRez R9637 (Zeneca Resins)
6.5% by weight N grade sodium Silicate (PQ Corp.)
13.0% by weight water The coating was applied with a standard #12 draw down rod followed by a 15 minute oven bake at 60 C. After allowing to cool for 10 minutes, the coating process was repeated to yield a dry film coating thickness of approximately 0.7 mils. After 570 days the panel was immersed in N-methylpyrollidone for 24 hours to dissolve coating. After light wiping, air drying, and reagent to alcohol rinsing, a 2 cm×7.5 cm section was cut off for potentiodynamic polarization testing.

b). Panel #4323 was an electrogalvanized steel panel (ACT E60 EZG 60G 2-side, clean, unpolished, 3"×6"×0.030") was rinsed with reagent alcohol and then with naphtha and coated with a gel of the following composition:

70.0 wt % Nyogel 759G (Nye Lubricants, Inc.)
10.0 wt % G Sodium Silicate (PQ Corp.)
10.0 wt. % Kasil ss-pwd Potassium Silicate (PQ Corp.)
10.0 wt. % Borogard ZB Zinc Borate (U.S. Borax)

The coating was applied with a gate type applicator to a thickness of 0.062 inches. After 107 days, the excess gel was carefully wiped off and the remaining thin film of gel was removed by spray-washing with naphtha with a solvent squirt bottle. The panel was allowed to air dry and then a 2 cm×7.5 cm section was cut off for potentiodynamic polarization testing.

c.) Panel #4977 was an electrogalvanized steel panel (ACT E60 EZG 60G 2-side, clean, unpolished, 3"×6"×0.030") was rinsed with reagent alcohol and then wiped with a Kimwipe. A 3"×4.5" area of the panel was then immersed in 800 mL of a solution of the following composition:

10 wt. % N grade sodium silicate solution (PQ Corp.)
90 wt. % deionized water

The panel was connected as the cathode to a DC power supply (Leader model # 718-20D) and a potential of 6.0 volts was applied. The anode was a panel of the same type as the cathode with the same area immersed in the solution (1:1 anode:cathode surface area), approximately 1.25 inches from the cathode. After 1 hour, the power supply was turned off and the panel was removed from solution. The panel was then air dried while hanging in a vertical position. After 24 days a 2 cm×7.5 cm section was cut off for potentiodynamic polarization testing.

d.) An untreated an electrogalvanized steel panel (ACT E60 EZG 60G 2-side, clean, unpolished, 3"×6"×0.030") was rinsed with reagent alcohol, wiped with a Kimwipe and then rinsed with naphtha and wiped with a Kimwipe and used as a control sample. A 2 cm×7.5 cm section was cut off for potentiodynamic polarization testing.

The following results were obtained:

| Sample # | Ecorr (Volts) | Icorr (A/sq. cm) | Bc | Ba |
| --- | --- | --- | --- | --- |
| A | −1.0275 | $2.27876 \times 10^{-6}$ | −0.142857 | 0.021357 |
| B | −1.0491 | $8.15915 \times 10^{-6}$ | −0.305985 | 0.027159 |
| C | −1.0538 | $1.74087 \times 10^{-7}$ | −0.058354 | 0.026380 |
| Control | −1.0408 | $5.62732 \times 10^{-5}$ | −0.809446 | 0.045221 |

The above results demonstrate that the aforementioned treatments produce a surface with a significantly lower corrosion curent density (Icorr) value and thus are significantly more corrosion resistant.

Example 36

The following Example demonstrates formation of the previously described mineral layer as a result of a component of the grease/gel interacting with the surface of galvanize metal substrates. The interaction was detected by using ESCA analysis in accordance with conventional methods.

Analytical conditions for ESCA:

| Instrument | Physical Electronics Model 5701 LSci |
| --- | --- |
| X-ray source | Monochromatic aluminum |
| Source power | 350 watts |
| Analysis region | 2 mm × 0.8 mm |
| Exit angle* | 50° |
| Electron acceptance angle | ±7° |
| Charge neutralization | electron flood gun |
| Charge correction | C—(C,H) in C 1s spectra at 284.6 eV |

*Exit angle is defined as the angle between the sample plane and the electron analyzer lens.

Coatings were made up based on the ingredients and formulation methods shown in Example 10. Different base oils and base oil combinations, alkali silicate types, silicate amounts, and substrates were used to represent a cross section of possible ranges. The different base oils comprised polyalphaolefin (polymerized 1-decene) and linseed oil. Two types of alkali silicates were also used, sodium and calcium silicate. The concentration of the alkali silicate was also varied from 1% to 50% wt to show the range of possible concentrations. Each set of coatings were applied onto both cold rolled and galvanized steel panels.

Each formulation was mixed together and applied onto the given substrate at a thickness between 5 and 10 mils. The coatings were allowed to set for at least 24 hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| | Formulations used for ESCA/XPS analysis | | | | | | | |
| --- | --- | --- | --- | --- | --- | --- | --- | --- |
| Sample # | 1 | 2 | 3 | 4 | 5 | 6 | 7 | 8 |
| Durasyn 174 wt. % (PAO) | 49.3 | 44.3 | 49.3 | 44.3 | 87 | 79.2 | 70.4 | 44 |
| Linseed Oil wt. % | 49 | 44 | 49 | 44 | 0 | 0 | 0 | 0 |
| Fumed Silica wt. % | 0.7 | 0.7 | 0.7 | 0.7 | 12 | 10.8 | 9.6 | 6 |
| Sodium silicate wt. % | 1 | 10 | 0 | 0 | 0 | 0 | 20 | 50 |
| Calcium silicate wt. % | 0 | 0 | 1 | 10 | 1 | 10 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. Higher binding energies (>103.8 eV) indicate precipitated silica due to the charging effect of the silica which has no chemical affinity to the surface. The resulting spectra show overlapping peaks, upon deconvolution reveal binding energies in the ranges representative of metal silicate and silica.

Example 37

The following Example demonstrates formation of the previously described mineral layer as a result of a component of the grease/gel interacting with the surface of lead substrates. The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto lead coupons. Prior to gel application, the lead coupons cut from lead sheets (McMasters-Carr) were cleaned of its oxide and other dirt by first rubbing with a steel wool pad. The residue was rinsed away with reagent alcohol and Kim wipes.

Each formulation was mixed together and applied onto a lead coupon at a thickness between 5 and 10 mils. The coatings were allowed to set for at least 24hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis on lead panels | | | | |
|---|---|---|---|---|
| Sample # | 1 | 2 | 3 | 4 |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. The resulting spectra show some overlapping peaks, upon deconvolution reveal binding energies in the ranges representative of metal silicate and silica. The primary binding energy for all of these samples were in the range of 102.1 to 102.3 eV.

Example 38

The following Example demonstrates formation of the previously described mineral layer as a component of the grease/gel interacting with the surface of GAL-FAN® substrates (a commercially available alloy comprising zinc and aluminum). The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto galfan coated steel coupons. Prior to gel application, the galfan coupon, cut from galfan sheets (GF90, Weirton Steel), were rinsed with reagent alcohol.

Each formulation was mixed together and applied onto a lead coupon at a thickness between 5 and 10 mils. The coatings were allowed to set for at least 24hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis on Galfan ® panels | | | | |
|---|---|---|---|---|
| Sample # | 1 | 2 | 3 | 4 |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates. ESCA detection of the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. The resulting spectra show some overlapping peaks, upon deconvolution reveal binding energies in the ranges representative of metal silicate and silica.

Example 39

The following Example demonstrates formation of the previously described mineral layer as a result of a component of the grease/gel interacting with the surface of copper substrates. The interaction was detected by using ESCA analysis in accordance with conventional methods.

Coatings were made up based on the ingredients shown in table shown below. Different alkali silicate types and silicate amounts were used to represent a cross section of possible ranges. Two types of alkali silicates were also used, sodium and calcium silicate. The concentration of the alkali silicate was also varied from 5% to 50% wt to show the range of possible concentrations. Each coatings was applied onto galfan coated steel coupons. Prior to gel application, the copper coupons cut from copper sheets (C 110, Fullerton Metals) were rinsed with reagent alcohol.

Each formulation was mixed together and applied onto a lead coupon at a thickness between 5 and 10 mils. The coatings were allowed to set for at least 24hours and then removed from the substrate. Removal was accomplished by first scraping off the excess coating. The residual coating was washed with the base oil used in the formulation to absorb any of the silica or silicates. Finally the excess oil is removed by washing with copious amounts of naphtha. Not adequately removing the silica from the residual coating, will leave behind a precipitate in the subsequent naphtha washing, making any surface analysis more difficult to impossible.

| Formulations used for ESCA/XPS analysis on copper | | | | |
|---|---|---|---|---|
| Sample # | 1 | 2 | 3 | 4 |
| Durasyn 174 wt. % | 89 | 74 | 89 | 44 |
| Fumed Silica wt. % | 6 | 6 | 6 | 6 |
| Sodium silicate wt. % | 0 | 0 | 5 | 50 |
| Calcium silicate wt. % | 5 | 20 | 0 | 0 |

ESCA was used to analyze the surface of each of the substrates. ESCA detects the reaction products between the metal substrate and the coating. Every sample measured showed a mixture of silica and metal silicate. The metal silicate is a result of the reaction between the metal cations of the surface and the alkali silicates of the coating. The silica is a result of either excess silicates from the reaction or precipitated silica from the coating removal process. The metal silicate is indicated by a Si (2p) binding energy (BE) in the low 102 eV range, typically between 102.1 to 102.3. The silica can be seen by Si(2p) BE between 103.3 to 103.6 eV. The resulting spectra show some overlapping peaks, upon deconvolution reveal binding energies in the ranges representative of metal silicate and silica.

It is to be understood that the foregoing is illustrative only and that other means and techniques may be employed without departing from the spirit or scope of the invention as defined in the following claims.

What is claimed is:

1. A mineralized surface formed by contacting a mineral precursor, comprising at least one silicate and having a basic pH, with a surface comprising at least one metal chosen from the group of magnesium, manganese, cobalt, nickel, copper, lead, zirconium, iron, chromium, zinc and alloys thereof wherein said mineralized surface comprises an amorphous phase and an inorganic oxide wherein the amount of oxygen present in said mineralized surface is less than stoichometric.

2. A mineralized layer comprising $A_xB_yO_z$—$nH_2$)

wherein A comprises at least one member chosen from the group of magnesium, manganese, cobalt, nickel, copper, lead, zirconium, iron, chromium, zinc and alloys thereof, B comprises silicon and at least one member chosen from the group of calcium and alkali metals wherein the values of x, y and z are greater than 0 and the ratio of y:z is less than or equal to 4:1 and wherein n ranges from about 0 to about 10.

3. A corrosion resistant mineralized layer comprising an amorphous phase and at least one crystalline inorganic oxide obtained by reacting a precursor, comprising at least one silicate and having a pH greater than about 8, with a surface comprising at least one metal wherein said at least one metal is present in said amorphous phase and said at least one crystalline inorganic oxide.

4. The corrosion resistant mineralized layer of claim 3 wherein the metal surface comprises at least one member selected from the group consisting of iron, steel, zinc, magnesium, aluminum, vanadium, calcium, beryllium, manganese, cobalt, nickel, copper, brass, bronze, zirconium, thallium, chromium, and alloys thereof.

5. The mineralized surface of claim 1 wherein said surface further comprises at least one of carbonates and oxides of said at least one metal.

6. The corrosion resistant mineralized layer of claim 3 wherein said surface further comprises at least one of carbonates and oxides of said least one metal.

7. The corrosion resistant mineralized layer of claim 3 wherein said precursor further comprises at least one member chosen from the group of water soluble salts and oxides of aluminum, silicon, tungsten, molybdenum, chromium, titanium, zircon, vanadium, phosphorus, aluminum, iron, boron, bismuth, gallium, tellurium, germanium, antimony, niobium, magnesium and manganese.

8. The corrosion resistant mineralized layer of claim 4 wherein the metal surface comprises an alloy comprising zinc and aluminum.

9. The mineralized surface of claim 1 wherein the contacting comprises providing the precursor to said metal in the form of at least one member chosen from the group of a paint, coating or gel.

10. The corrosion resistant mineralized layer of claim 3 wherein said at least one silicate comprises at least one member chosen from the group of sodium silicate, calcium silicate and potassium silicate.

11. The mineralized surface of claim 1 wherein the mineral surface is about 10 to 50 microns in thickness.

12. The corrosion resistant mineralized layer of claim 3 wherein said at least one silicate comprises at least one member chosen from the group of calcium silicate, potassium silicate and sodium silicate.

13. The corrosion resistant mineralized layer of claim 3 wherein the precursor comprises at least one carrier chosen from the group of polyalpholefin, polybutene and polyurethane and the at least one silicate comprises about 1 to 30 wt. % of the precursor.

14. The corrosion resistant mineralized layer of claim 3 wherein said reacting occurs in a reduced oxygen environment.

15. The mineralized surface of claim 1 wherein the Si(2p) photoelectron binding energy, measured by X-ray Photoelectron Spectroscopy, ranges from greater than about 102.1 and less than about 103.3 eV.

* * * * *